United States Patent
Izutani et al.

(10) Patent No.: US 9,616,528 B2
(45) Date of Patent: Apr. 11, 2017

(54) SOLID WIRE, AND GAS-SHIELDED ARC WELDING METHOD USING SAME

(71) Applicant: KABUSHIKI KAISHA KOBE SEIKO SHO (Kobe Steel, Ltd.), Kobe-shi (JP)

(72) Inventors: Shun Izutani, Fujisawa (JP); Kei Yamazaki, Fujisawa (JP); Reiichi Suzuki, Fujisawa (JP); Keiichiro Yanagi, Fukuchiyama (JP); Yuji Ueda, Osaka (JP); Kazuki Nakamura, Osaka (JP); Toshiro Uezono, Osaka (JP)

(73) Assignees: Kobe Steel, Ltd., Kobe-shi (JP); DAIHEN Corporation, Osaka-shi (JP)

( * ) Notice: Subject to any disclaimer, the term of this patent is extended or adjusted under 35 U.S.C. 154(b) by 283 days.

(21) Appl. No.: 14/382,691

(22) PCT Filed: Feb. 28, 2013

(86) PCT No.: PCT/JP2013/055567
§ 371 (c)(1),
(2) Date: Sep. 3, 2014

(87) PCT Pub. No.: WO2013/133140
PCT Pub. Date: Sep. 12, 2013

(65) Prior Publication Data
US 2015/0027995 A1     Jan. 29, 2015

(30) Foreign Application Priority Data

Mar. 9, 2012   (JP) ................................. 2012-053779

(51) Int. Cl.
*B23K 9/16*     (2006.01)
*B23K 9/173*     (2006.01)
(Continued)

(52) U.S. Cl.
CPC .......... *B23K 35/0261* (2013.01); *B23K 9/025* (2013.01); *B23K 9/093* (2013.01);
(Continued)

(58) Field of Classification Search
CPC .......... B23K 9/16; B23K 9/173; B23K 35/00; B23K 35/0261
See application file for complete search history.

(56) References Cited

U.S. PATENT DOCUMENTS

| | | | |
|---|---|---|---|
| 2003/0019856 A1* | 1/2003 | Correia | B23K 1/00 219/129 |
| 2006/0213874 A1* | 9/2006 | Wada | B23K 9/173 219/74 |

(Continued)

FOREIGN PATENT DOCUMENTS

| | | |
|---|---|---|
| CN | 101804495 A | 8/2010 |
| EP | 0 607 819 A1 | 7/1994 |

(Continued)

OTHER PUBLICATIONS

Extended European Search Report issued Feb. 26, 2016 in Patent Application No. 13758142.7.

(Continued)

*Primary Examiner* — Ryan Reis
(74) *Attorney, Agent, or Firm* — Oblon, McClelland, Maier & Neustadt, L.L.P.

(57) ABSTRACT

A solid wire is for gas-shielded arc welding, using a shielding gas, and for galvanized steel sheet welding. The solid wire comprises, to the mass of the whole of the solid wire, predetermined amount of C, Si, Mn, P, S, O, and Cr, with the balance consisting Fe and inevitable impurities. The solid wire satisfies "1.0≤(percentage by mass of Si+that by mass of Mn)/{100(that by mass of S+that by mass of O}≤4.0" and "0.50≤percentage by mass of Mn/that by mass of Si≤2.00".

(Continued)

The shielding gas is an Ar gas comprising 25 to 40% of $CO_2$ gas. It is achieved to improve spatter-decreasing performance and pore-resisting performance (performance of restraining the generation of porosity defects, such as pits and blowholes).

15 Claims, 4 Drawing Sheets

(51) Int. Cl.
*B23K 35/02* (2006.01)
*B23K 9/23* (2006.01)
*B23K 35/30* (2006.01)
*B23K 9/025* (2006.01)
*B23K 9/09* (2006.01)
*B23K 101/00* (2006.01)
*B23K 101/34* (2006.01)
*B23K 103/04* (2006.01)

(52) U.S. Cl.
CPC .............. *B23K 9/16* (2013.01); *B23K 9/173* (2013.01); *B23K 9/23* (2013.01); *B23K 35/3053* (2013.01); *B23K 2201/006* (2013.01); *B23K 2201/34* (2013.01); *B23K 2203/04* (2013.01)

(56) References Cited

U.S. PATENT DOCUMENTS

| | | | |
|---|---|---|---|
| 2010/0200553 A1 | 8/2010 | Yamazaki et al. | |
| 2011/0174784 A1* | 7/2011 | Kamei | B23K 1/14 |
| | | | 219/74 |

FOREIGN PATENT DOCUMENTS

| | | | |
|---|---|---|---|
| JP | 63-242488 | | 10/1988 |
| JP | 1-143775 | | 6/1989 |
| JP | 4-135088 | | 5/1992 |
| JP | 5-200581 | | 8/1993 |
| JP | 6-210490 | | 8/1994 |
| JP | 7-80678 | | 3/1995 |
| JP | 7-232294 | | 9/1995 |
| JP | 2004-136342 | | 5/2004 |
| JP | 2004136342 A | * | 5/2004 |
| JP | 2008-229687 A | | 10/2008 |
| JP | 2008229687 A | * | 10/2008 |
| JP | 2011-131243 A | | 7/2011 |
| JP | 2011131243 A | * | 7/2011 |

OTHER PUBLICATIONS

International Search Report issued May 14, 2013, in PCT/JP13/055567 filed Feb. 28, 2013.

* cited by examiner (a)

(b)

SOLID WIRE, AND GAS-SHIELDED ARC WELDING METHOD USING SAME

TECHNICAL FIELD

The present invention relates to a solid wire for gas-shielded arc welding and for galvanized steel sheet welding, and a gas-shielded arc welding method using this wire.

BACKGROUND ART

Galvanized steel sheets are relatively inexpensive, and also excellent in rust resistance. Thus, the sheets are used in many fields of automobiles, architecture and construction materials, electronic products, and others.

Regarding a galvanized steel sheet, the coating weight (the amount of deposit per unit area) of its galvanization is varied in accordance with a use field thereof. However, even when the coating weight is varied, gas metal arc welding (GMAW) using a solid wire is used for welding the galvanized steel sheet in many cases. In particular, in the field of automobiles, the GMAW is very frequently used.

Although galvanized steel sheets have the above-mentioned advantages (low costs and rust resistance), it cannot be said that the sheets are excellent in weldability when a solid wire is used to subject the sheets to gas metal arc welding. It is known that many porosity defects such as pits and blowholes, and spatters are generated.

A cause that galvanized steel sheets are not excellent in weldability as described above would be that the boiling point of zinc is largely lower than that of iron. Specifically, in the state where iron of a galvanized steel sheet is melted while this sheet is being welded, its zinc is already in a gasified state to be present in the form of a vapor (zinc gas). As a result, the zinc gas generated from the molten pool remains in the molten pool, so that porosity defects such as pits or blowholes are generated. Moreover, the zinc gas jetted out from the molten pool disturbs the droplet transfer at the time of the welding, so that spatters are generated in a large amount.

Considering such a situation, various suggestions as described below are made regarding a solid wire in which the generation of porosity defects such as pits and blowholes is restrained, and spatters are decreased.

For example, JP 1101-143775 A suggests a welding method using a wire in which the content of each of Si and Mn is restrained within a predetermined value, and further using an Ar gas into which CO2 or O2 is incorporated in a predetermined proportion.

JP S63-242488 A and JP H04-135088 A each suggest a wire in which the content of each of Si and Mn is restrained within a predetermined value.

JP H07-80678 A suggests a wire in which the content of each of Si and Mn is restrained within a predetermined value, and Al and Ti are each incorporated in a predetermined proportion.

JP 2004-136342 A suggests a wire in which the content of each of Si, Mn and Cr is restrained within a predetermined value.

SUMMARY OF THE INVENTION

Problems to be Solved by the Invention

In any of the techniques according to Patent Documents 2 to 5, the composition of a wire is restricted. However, the mere restriction of only the composition makes it impossible to exhibit sufficiently the effects of the restraint of the generation of porosity defects and a decrease of spatters under severe welding conditions, such as a downhill-welding position, which causes porosity defects or spatters very frequently.

In the technique according to Patent Document 1, the composition of a shielding gas is restricted as well as the composition of a wire. However, this combination makes it impossible to exhibit sufficiently the effects of the restraint of the generation of porosity defects and a decrease of spatters. Additionally, when $O_2$ is mixed with the shielding gas in the technique according to Patent Document 1, the surface tension of the molten pool lowers too much so that porosity defects or spatters are generated in a large amount.

In short, the techniques according to Patent Documents 1 to 5 are insufficient for restraining the generation of porosity defects and decreasing spatters.

Thus, an object of the present invention is to provide a solid wire which is improved in spatter-decreasing performance and pore-resisting performance (performance of restraining the generation of porosity defects, such as pits and blowholes), and which further allows the external appearance of the bead to be excellent; and a gas-shielded arc welding method using this wire.

Means for Solving the Problems

In order to solve the problems, the present inventors have made eager researches to find out that the problems can be solved by restricting each element contained in a solid wire to a predetermined proportion and further using, as a shielding gas, an Ar gas containing a predetermined proportion of $CO_2$ gas. Thus, the present invention has been achieved.

The present invention provides a solid wire for gas-shielded arc welding, using a shielding gas, and for galvanized steel sheet welding. The solid wire comprising, to the mass of the whole of the solid wire, C, 0.15% by mass or less, Si: 0.40 to 0.90% by mass, Mn: 0.20 to 1.50% by mass, P: 0.0500% by mass or less, S: 0.0080% by mass or less, O: 0.0100% by mass or less, and Cr: 1.00% by mass or less, with the balance consisting Fe and inevitable impurities. The solid wire satisfies the following:

1.0≤(percentage by mass of Si+that by mass of Mn)/
{100(that by mass of S+that by mass of
O}≤4.0, and 0.50≤percentage by mass of Mn/that by mass of
Si≤2.00.

The shielding gas is an Ar gas comprising 25 to 40% of $CO_2$ gas.

In this way, in the solid wire according to the invention, each of the elements contained in the solid wire is restricted to the predetermined proportion, thereby making it possible to heighten the surface tension of a melted metal formed by the melting of the solid wire, so as to control the thickness L (see FIG. 1) of the melted region into a thin state when the wire is used to perform gas-shielding arc welding. Accordingly, zinc gas, which particularly causes a problem when a galvanized steel sheet is used as a base metal member, is easily released outward from the upper surface of the melted region. This can result in the restraint of the generation of porosity defects, such as pits and blowholes, generated by the solidification of the melted metal in the state where the zinc gas remains in the melted metal.

In the solid wire according to the invention, each of the elements contained in the solid wire is restricted to the predetermined proportion, thereby making it possible to heighten the surface tension of a melted droplet formed around the tip of the solid wire at the time of the gas-shielding welding, so as to stabilize the shape of the melted droplet. As a result, the generation of spatters can be restrained.

Furthermore, by the use of the Ar gas, which contains the predetermined proportion of $CO_2$, as the shielding gas, the solid wire according to the invention makes it possible to enlarge arc power generated between the solid wire and the base metal member at the time of the gas-shield arc welding, so as to dig down a weld region just below the solid wire largely. Thus, at the time of the gas-shield arc welding, the thickness L (see FIG. 1) of the melted region can be controlled into a thin state. Finally, the generation of porosity defects such as pits and blowholes can be restrained.

Additionally, in the solid wire according to the invention, the value of "the percentage by mass of Mn"/"the percentage by mass of Si" is restricted to the predetermined value or less, as well as each of the elements contained in the solid wire is restricted. The restrictions make it possible to allow the external appearance of the bead to be excellent.

Further it is preferable that a wire diameter of the solid wire according to the present invention is 0.7 to 1.1 mm.

In this way, in the solid wire according to the invention, the wire diameter is restricted into the predetermined range, whereby an appropriate pinching force is easily applied to the melted droplet formed around the tip of the solid wire at the time of the gas-shielding arc welding, so as to cause smooth droplet transfer. As a result, the melted droplet can be prevented from growing coarsely. Thus, the effect of restraining the generation of spatters can be further improved.

A method according to the present invention provides a gas-shielded arc welding method, comprising: feeding the above-mentioned solid wire into a shielding gas which is an Ar gas comprising 25 to 40% of $CO_2$ gas; and supplying a welding current to the solid wire to generate arc between the solid wire and a galvanized steel sheet which is a base metal member, thereby welding the steel sheet.

In the gas-shielded arc welding method according to the invention, the use of the above-mentioned solid wire in this way makes it possible to heighten the surface tension of a melted metal formed by the melting of the solid wire, so as to control the thickness L (see FIG. 1) of the melted region into a thin state. Accordingly, zinc gas, which particularly causes a problem when a galvanized steel sheet is used as a base metal member, is easily released outward from the upper surface of the melted region. This can result in the restraint of the generation of porosity defects, such as pits and blowholes, generated by the solidification of the melted metal in the state where the zinc gas remains in the melted metal.

In the gas-shielded arc welding method according to the invention, the use of the above-mentioned solid wire makes it possible to heighten the surface tension of a melted droplet formed around the tip of the solid wire, so as to stabilize the shape of the melted droplet. As a result, the generation of spatters can be restrained.

In the gas-shielded arc welding method according to the invention, the use of the Ar gas, which contains the predetermined proportion of $CO_2$, as the shielding gas makes it possible to enlarge arc power generated between the solid wire and the base metal member, so as to dig down a weld region just below the solid wire largely. Thus, the thickness L (see FIG. 1) of the melted region can be controlled into a thin state. Finally, the generation of porosity defects such as pits and blowholes can be restrained.

Additionally, in the gas-shielded arc welding method according to the invention, the use of the above-mentioned solid wire makes it possible to allow the external appearance of the bead to be excellent.

Further in the gas-shielded arc welding method according to the present invention, the welding current is a pulse current. The pulse current is a current generated by repeating an electric conduction for a first peak, an electric conduction for a second peak, and an electric conduction of a base current as one pulse cycle. It is preferable that the current value of the first peak is from 440 to 500 A, the term of the first peak is from 0.2 to 0.6 ms, the current value of the second peak is from 300 to 400 A, and the term of the second peak is from 0.2 to 0.6 ms, and the term for which the pulse current shifts from the first peak to the second peak is from 0.2 to 0.6 ms.

In this way, the gas-shielded arc welding method according to the invention makes use, as the welding current, of the predetermined pulse current having two peaks. This makes it possible to improve the effect of restraining the generation of spatters without causing weld defects, such as a cut, even when the content of $CO_2$ gas in the shield gas is large.

In the gas-shielded arc welding method according to the present invention, it is preferable that as the welding current, a pulse current generated by repeating alternately a first period in which one pulse cycle is densely and continuously recurred, and a second period in which one pulse cycle is thinly and continuously recurred is used, and the first period and the second period are repeated at a frequency of 5 to 30 Hz.

In this way, the gas-shielded arc welding method according to the invention makes use, as the welding current, of the pulse current generated by repeating the first period and the second period alternately at the predetermined frequency. This makes it possible to vibrate the melted region so that zinc gas included in the melted region is easily released outward. This can result in the restraint of the generation of porosity defects, such as pits and blowholes, generated by the solidification of the melted metal in the state where the zinc gas remains in the melted metal.

Effect of Invention

In the solid wire according to the present invention, each of the elements contained in the solid wire is restricted to the predetermined proportion, thereby making it possible to restrain the generation of porosity defects, such as pit and blowholes, and spatters and further allow the external appearance of the bead to be excellent.

Furthermore, by the use of the Ar gas, which contains the predetermined proportion of $CO_2$, as the shielding gas, the solid wire according to the invention makes it possible to enlarge arc power generated between the solid wire and the base metal member, so as to further restrain the generation of porosity defects, such as pit and blowholes.

In conclusion, the solid wire according to the invention can be improved in spatter-decreasing performance and pore-resisting performance (performance of restraining the generation of porosity defects, such as pits and blowholes), and can further allow the external appearance of the bead to be excellent.

In the gas-shielded arc welding method according to the invention, the use of the above-mentioned solid wire makes it possible to restrain the generation of porosity defects, such as pit and blowholes, and spatters and further allows the external appearance of the bead to be excellent.

In the gas-shielded arc welding method according to the invention, the use of the Ar gas, which contains the predetermined proportion of $CO_2$, as the shielding gas makes it possible to enlarge arc power generated between the solid wire and the base metal member, so as to further restrain the generation of porosity defects, such as pits and blowholes.

In conclusion, the gas-shielded arc welding according to the invention can be improved in spatter-decreasing performance and pore-resisting performance (performance of restraining the generation of porosity defects, such as pits and blowholes), and can further allow the external appearance of the bead to be excellent.

BRIEF DESCRIPTION OF DRAWINGS

FIGS. 3(a) and 3(b) are respective waveform charts of the pulse current and the voltage;

FIG. 5(a) is a schematic view demonstrating a horizontal-welding position, and FIG. 5(b) is a schematic view demonstrating a downhill-welding position.

MODE FOR CARRYING OUT THE INVENTION

Referring appropriately to the drawings, a description will be made hereinafter regarding the solid wire according to the present invention, and mode (embodiments) for carrying out a gas-shielded arc welding method using this wire.

[Mechanism for Restraining Generation of Porosity Defects and Spatters]

Figure 1:
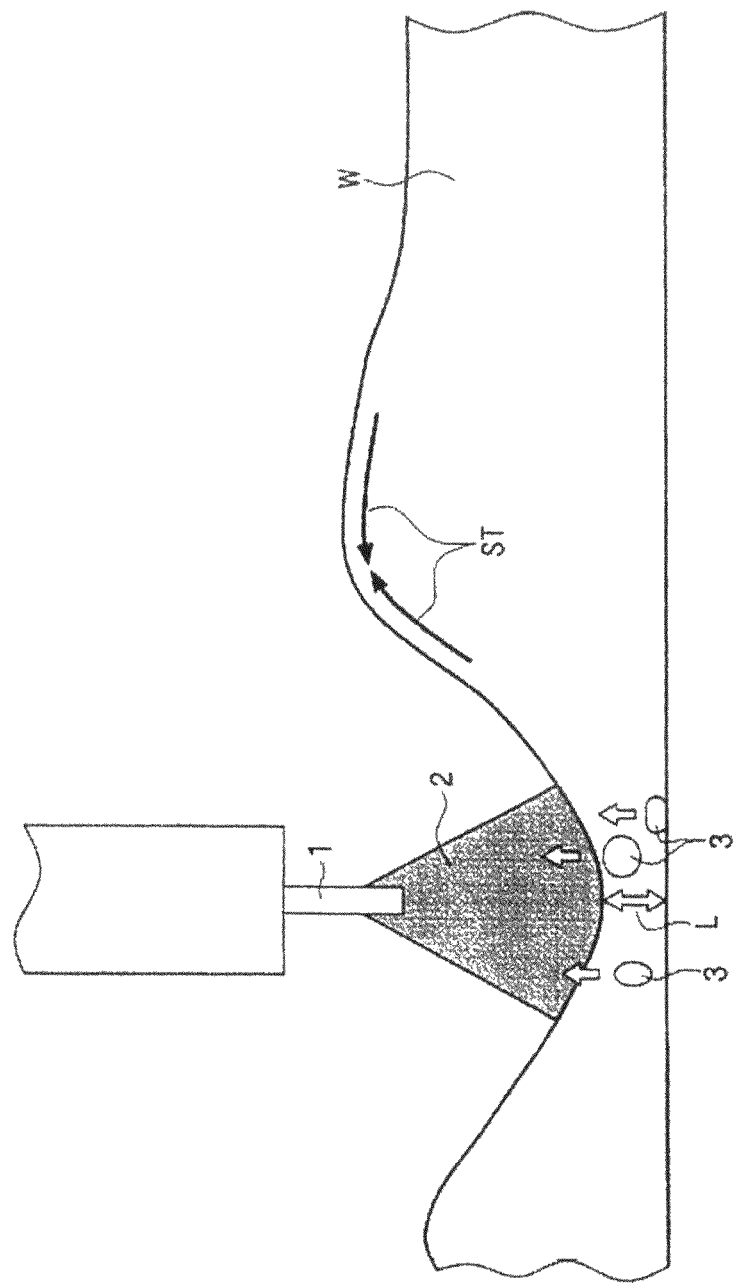
FIG. 1 is a schematic view illustrating a state where a solid wire according to the present invention is used to perform gas-shielded arc welding.

A brief description is first made with reference to FIG. 1 regarding a mechanism for restraining the generation of porosity defects and spatters at the time of the gas-shielded arc welding of a galvanized steel sheet.

(Regarding Porosity Defects)

Gas-shielded arc welding is welding performed by generating an arc 2 between a solid wire 1 and a melted region (referred to also as a molten pool hereinafter) of a base metal member W. When the base metal member W is a galvanized steel sheet, heat of the arc 2 allows zinc plating, which is low in boiling point, to turn into zinc gas 3. The zinc gas 3 rises up from the lower part of the melted region to the upper part thereof.

When the zinc gas 3 is released outward from the upper surface of the melted region, no problem is caused. However, when the gas 3 remains in the melted region to be solidified while the gas-remaining state is kept, blowholes, which are substantially spherical cavities, are formed. When the zinc gas 3 is solidified in the vicinity of the surface of the base metal member W, pits, which are small dents, are formed.

The present invention is based on an idea that the thickness L of the melted region is controlled into a thin state, and this makes it easy to release, from the upper surface of the melted region, the zinc gas 3 generated from the lower part of the melted region, thereby decreasing the probability that the zinc gas 3 remains in the melted region, so that the generation of porosity defects is finally restrained.

In the present invention, the thickness L of the melted region of the base metal member W is controlled into a thin state by combining the following manners with each other: a manner (i) of heightening the surface tension ST of the meted metal, thereby holding the melted metal in the state where the periphery of the melted region is heaped up as illustrated in FIG. 1 to prevent the inflow of the melted metal into the melted region; and a manner (ii) of making the arc power large to dig down the melted region just below the solid wire 1 largely. In short, the present invention makes it possible to restrain the generation of porosity defects by controlling the thickness L of the melted region of the base metal member W into a thin state according to the manners (i) and (ii).

Regarding the manner (i), control is made mainly by restricting the composition of the solid wire. Regarding the manner (ii), control is made mainly by restricting the content of $CO_2$ in the shielding gas into a large range. The details of the manners will be described later.

The effect of restraining the generation of porosity defects can be further improved by combining, therewith, a manner (iii) of vibrating the melted region (molten pool) to make the release of the zinc gas 3 from the melted region easy.

Regarding the manner (iii), control is made mainly by using, as a welding current, a pulse current generated by repeating a first period and a second period alternately at a predetermined frequency. The details of the manner will be described later.

(Regarding Spatters)

In order to control the manner (ii) in the present invention, the $CO_2$ content in the shielding gas is restricted into the large range; however, if the $CO_2$ content becomes large, power for holding up a melted droplet formed around the tip of the tip of the solid wire also becomes large. As a result, the melted droplet usually changes in shape so that spatters having a large size of 1 mm or more are generated. However, in the manner (i), the surface tension ST of the melted droplet (melted metal) is made high so that the melted droplet does not easily change in shape. As a result, in the invention, the generation of spatters can be restrained by the manner (i).

As described above, regarding the manner (i), control is made mainly by restricting the composition of the solid wire.

Furthermore, by combining, therewith, a manner (iv) of restricting the diameter of the solid wire to a predetermined value or less, pinching force is allowed to act appropriately onto the melted droplet around the tip of the solid wire so as to cause smooth droplet transfer. Thus, the melted droplet can be prevented from growing coarsely to make a further improvement in the effect of restraining the generation of spatters.

Additionally, by combining, therewith, a manner (v) of using, as the welding current, a pulse current having two peaks so as to allow the pinching force to act onto the whole of the melted droplet formed around the tip of the solid wire, a further improvement can be made in the effect of restraining the generation of spatters.

Regarding the manner (iv), control can be made by restricting the diameter of the solid wire. Regarding the manner (v), control can be made by using, as the welding current, a predetermined pulse current having two peaks. The details of the manners will be described later.

[Solid Wire]

The solid wire (referred to also merely as the wire hereinafter) according to the present invention is a solid wire not only for gas-shielded arc welding using a shielding gas but also for galvanized steel sheet welding.

The solid wire according to the invention includes each of C, Si, Mn, P, S, O and Cr in a predetermined proportion and is constituted with the balance consisting Fe and inevitable impurities, and further satisfies a predetermined relationship of the respective contents of Si, Mn, S and O.

Hereinafter, a description will be made about the reasons why the content of each of the elements in the solid wire according to the present invention is restricted. This content is the content of the element to the mass of the whole of the solid wire.

(C, 0.15% by Mass or Less)

C is an element to improve the wire in strength. If C is present excessively in a proportion more than 0.15% by mass, spatters may be very frequently generated. Thus, if the C content is smaller, it is preferred. No problem is caused even when the wire is a C-free wire. Thus, the C content is set to 0.15% by mass or less (the value also includes 0% by mass).

(Si: 0.40 to 0.90% by Mass)

Si is an effective deoxidizing agent, and is an element indispensable for deoxidizing a welding metal. If the Si content is less than 0.40% by mass, the deoxidizing effect is damaged and the metal is lowered in surface tension. Thus, porosity defects such as pits and blowholes are easily generated. Further, Si has a feature that if the Si content is made lower, the electric resistance of the wire becomes lower. As the electric resistance of the wire becomes lower, the wire is less easily melted (the electric resistance heat becomes lower) so that a necessary welding current becomes larger. As a result, the arc power becomes higher so that porosity defects such as pits and blowholes can be restrained. If the Si content is more than 0.90% by mass, slags are generated in a large amount in the surface of the bead. Thus, the Si content is set into the range of 0.40 to 0.90% by mass.

(Mn: 0.20 to 1.50% by Mass)

Mn is an effective deoxidizing agent as in Si, and is an element bondable easily to S. If the Mn content is less than 0.20% by mass, its deoxidizing and desulfurizing effects are damaged and the wire makes a welding metal low in surface tension. Thus, porosity defects such as pits and blowholes are easily generated. On the other hand, if the Mn content is more than 1.50% by mass, a thin oxidized film that is not easily peeled is generated on the bead surface. Thus, the Mn content is set into the range of 0.20 to 1.50% by mass.

(P: 0.0500% by Mass or Less)

P is an element contaminated as an impurity. The P content is preferably as small as possible from the viewpoint of weld cracking. Contrarily, in the welding of a galvanized steel sheet, P is combined with zinc at a melting point of zinc or higher to form a stable compound (such as P—Zn). Thus, P has an effect of improving pore-resisting performance in the wire. However, if the P content is more than 0.0500% by mass, the steel sheet is cracked. Thus, the P content is set to 0.0500% by mass or less (the value also includes 0% by mass).

(S: 0.0080% by Mass or Less)

S is an element making the surface tension of a melted metal low when added to the wire in a small proportion. The S content is preferably extremely small. Specifically, if the S content is more than 0.0080% by mass, the melted metal is excessively lowered in surface tension so that pits and blowholes are easily generated. Thus, the S content is set to 0.0080% by mass or less (the value also includes 0% by mass).

(O: 0.0100% by Mass or Less)

O is an element making the surface tension of a melted metal low as in S when added to the wire in a small proportion. The O content is preferably extremely small. Specifically, if the O content is more than 0.0100% by mass, the melted metal is excessively lowered in surface tension so that pits and blowholes are easily generated. Thus, the O content is set to 0.0100% by mass or less (the value also includes 0% by mass).

(Cr: 1.00% by Mass or Less)

Cr is an element making, when added to Fe, the viscosity thereof large. When the viscosity of the wire is increased, a welding metal can be prevented from flowing excessively to the sites just below the arc. However, if the Cr content is more than 1.00% by mass, the viscosity becomes too high so that the shape of the bead turns into a convex form. Thus, the external appearance of the bead becomes bad. When the Cr content ranges from 0.10 to 0.60% by mass, the wire can be more properly improved in pore-resisting performance. Thus, the Cr content is 1.00% by mass or less, preferably from 0.10 to 0.60% by mass.

$$1.0 \leq (\text{percentage by mass of Si} + \text{that by mass of Mn})/\{100(\text{that by mass of S} + \text{that by mass of O}\} \leq 4.0$$

As described above, in order to restrain the generation of porosity defects, it is necessary to heighten the surface tension of the melted metal. The surface tension of the melted metal depends on the chemical composition of the solid wire.

Of the elements constituting the solid wire, elements making the surface tension largely low are oxygen (O) and sulfur (S). In other words, it is necessary to restrain the addition of the elements O and S as much as possible. The elements O and S bond easily to Si and Mn. By producing oxides or sulfides, the adsorption of O and S onto the surface can be prevented to keep the surface tension high. Thus, in the present invention, the relationship between the respective contents of Si, Mn, S and O is specified. Optimal are the respective contents of S, O, Si and Mn that satisfy the following expression (1).

$$1.0 \leq (\text{percentage by mass of Si} + \text{that by mass of Mn})/\{100(\text{that by mass of S} + \text{that by mass of O}) \leq 4.0 \quad (1)$$

If this parameter is less than 1.0, the surface tension is excessively lowered so that many porosity defects such as pit and blowholes are generated. Contrarily, if the parameter is more than 4.0, the amount of slags is increased and the surface tension is excessively heightened so that the bead shape turns into a convex form to deteriorate the external appearance of the bead. Thus, the contents are adjusted to satisfy the following: $1.0 \leq$(percentage by mass of Si+that by mass of Mn)/{100 (that by mass of S+that by mass of O}$\leq 4.0$. In the expression (1) and any other expression related to the present invention, the "percentage by mass of element" denotes the percentage by mass of the element to the mass of the whole of the solid wire.

$$(0.50 \leq \text{percentage by mass of Mn/that by mass of Si} \leq 2.00)$$

Even when the Si and Mn contents satisfy the expression (1), a useful deoxidizing rate is not obtained unless the ratio of the percentage by mass of Mn to that by mass of Si is high. Specifically, if the ratio of the percentage by mass of Mn to that by mass of Si is less than 0.50, a sufficient deoxidizing effect is not obtained so that oxygen becomes excessive to lower the surface tension of the melted metal. As a result, porosity defects such as pits and blowholes are easily generated. Contrarily, if the ratio of the percentage by mass of Mn to that by mass of Si is more than 2.00, the Mn content by percentage is large so that a Mn oxide, which is not easily peeled, is produced onto the bead surface. As a result, the external appearance of the bead becomes bad. Thus, the ratio of the percentage by mass of Mn to that by mass of Si is set into the range represented by the following expression (2).

$$0.50 \leq \text{percentage by mass of Mn/that by mass of Si} \leq 2.00 \quad (2)$$

(Fe and Inevitable Impurities)

The balance of the solid wire is composed of Fe and inevitable impurities. Examples of the inevitable impurities include Cu, Mo, Al, Ti, Nb, Zr, N and the like. The inevitable impurities may be contained in the wire as far as the effect of the present invention is not disturbed. The details thereof are as follows.

Cu and Mo are elements making the wire high in strength. When the strength needs to be adjusted, these elements may be added. If the Cu content is more than 3.00% by mass, the wire is broken when elongated. Thus, the Cu content is set to 3.00% by mass or less. If the Mo content is more than 5.00% by mass, the strength is excessive so that weld cracking is caused. Thus, the Mn content is set to 5.00% by mass or less.

Al, Ti, Nb and Zr are intensely deoxidizing elements, and are capable of decreasing the oxygen amount in the melted metal to lower the surface tension. Thus, when the oxygen amount in the wire is high, the addition thereof is effective. However, if each of the elements is added in a proportion more than 0.500% by mass, a large amount of slags is generated. Thus, the content of each of Al, Ti, Nb and Zr is set to 0.500% by mass or less.

N is generally an element contaminated as an impurity. As the N content is larger, an excessive increase in the strength of the wire and porosity defects are generated. In order to prevent the generation of these drawbacks, the N content is set to 0.0200% by mass or less.

(Diameter of Solid Wire)

As the diameter of the solid wire is smaller, pinching force is more easily applied to a melted droplet so as to cause smooth droplet transfer. However, if the diameter is less than 0.7 mm, the arc power is lowered so that porosity defects such as pits and blowholes are easily generated. Contrarily, if the diameter is more than 1.1 mm, a melted droplet around the tip of the solid wire grow coarsely so that spatters having a large diameter of 1 mm or more are easily generated. Thus, the diameter of the solid wire ranges preferably from 0.7 to 1.1 mm, more preferably from 0.8 to 1.0 mm.

[Shielding Gas]

The shielding gas related to the present invention is an Ar gas containing 25 to 40% of $CO_2$ gas. In other words, the shielding gas related to the invention is an Ar—$CO_2$ gas containing 25 to 40% of $CO_2$ gas and Ar gas as the balance.

Usually, the Ar—$CO_2$ gas used for gas-shielded arc welding is an Ar—$CO_2$ gas in which the $CO_2$ content is 20%. This is because if the $CO_2$ content by percentage in an Ar—$CO_2$ gas is large, a large amount of spatters is generated. Thus, an Ar—$CO_2$ gas in which the $CO_2$ content is more than 20% has hardly been used. However, considering the pore-resisting performance, according to any Ar—$CO_2$ gas in which the $CO_2$ content by percentage is a conventional value, the arc power is unfavorably small to heighten the probability that porosity defects such as pits and blowholes are generated.

Thus, in the present invention, the above-mentioned solid wire, in which the content of each of the elements is restricted to the predetermined proportion, is used; even when the shielding gas is an Ar—$CO_2$ gas containing up to 40% of $CO_2$ gas, this makes it possible to attain stable welding while restraining the generation of spatters, and further concentrate arc by an arc-constricting property which $CO_2$ has so as to heighten the arc power (improve the pore-resisting performance). However, if the $CO_2$ gas content is more than 40%, the generation of spatters cannot be restrained. Contrarily, if the $CO_2$ content is less than 25%, a sufficient arc power is not obtained. Thus, the $CO_2$ content by percentage in the Ar gas (Ar—$CO_2$ gas) as the shielding gas ranges from 25 to 40%.

[Base Metal Member]

The base metal member to be welded is a galvanized steel sheet. The galvanized steel sheet is a plate member in which a galvanization coating is formed on the surface of the steel sheet. The composition, thickness and other factors of the steel sheet are not particularly limited. The coating weight of the galvanization onto the surface of the base metal member is not also particularly limited.

[Gas-Shielded Arc Welding Method]

The following will describe a gas-shielded arc welding method.

The gas-shielded arc welding method according to the present invention includes: feeding a solid wire into a shielding gas as an Ar gas (Ar—$CO_2$ gas); and supplying a welding current to the solid wire to generate arc between the solid wire and a galvanized steel sheet which is a base metal member, thereby welding the steel sheet.

(Pulse Current Having Two Peaks)

The welding current used in the gas-shielded arc welding method according to the present invention is preferably a pulse current. The pulse current is preferably a current generated by repeating an electric conduction for a first peak, an electric conduction for a second peak, and an electric conduction of a base current as one pulse cycle.

Figure 2:
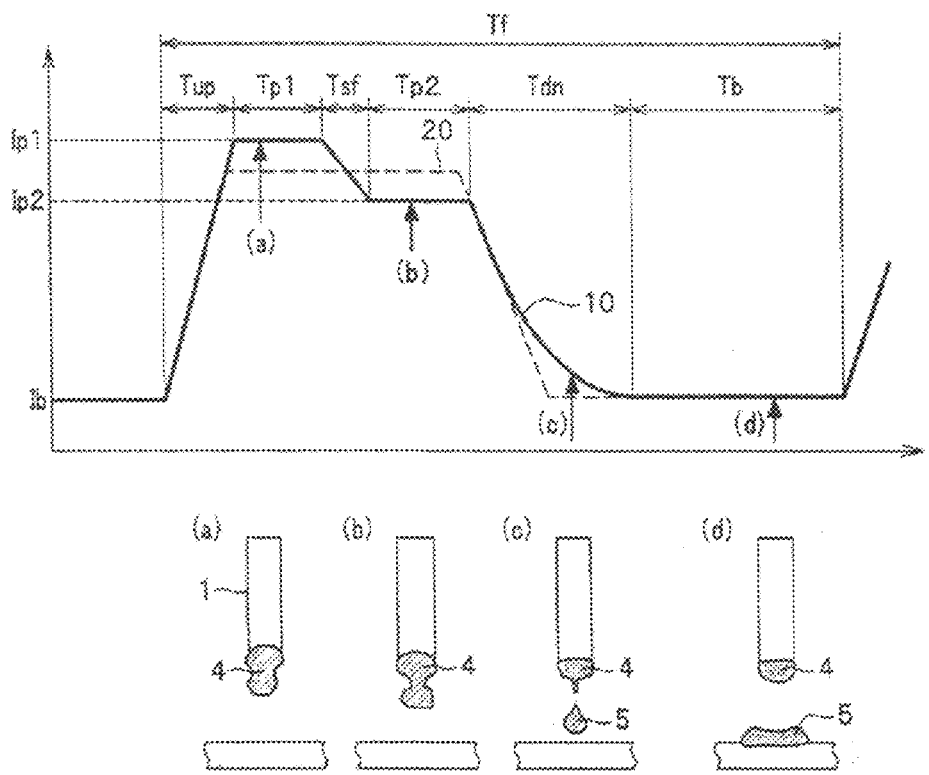
FIG. 2 is a waveform chart of a pulse current having two peaks, which is used in gas-shielded arc welding according to the invention, in which (a) to (d) are schematic views each showing the state of a melted droplet at a predetermined time in the waveform chart.

Specifically, as illustrated in FIG. 2, in a pulse current 10, the followings are repeated as one pulse cycle Tf: a peak rising-up term Tup, a first peak term Tp1, a shift term Tsf, a second peak term Tp2, a peak falling-down term Tdn, and a base term Tb.

A brief description is made about the reasons why the pulse current as described above is used as the welding current.

In the present invention, an Ar gas having a high $CO_2$ content by percentage (i.e., a gas having a low Ar content by percentage) is used as the shielding gas; however, the use of the gas having a low Ar content by percentage makes it difficult to make the arc at the time of the pulse current welding into a spray arc form, so that spatters are easily generated. Specifically, the position of the generation of the arc becomes a low position of a side of the solid wire (position near the tip of the solid wire), so that a melted droplet formed around the tip of the solid wire cannot be sufficiently tightened by pinching force. Accordingly, an appropriate spray arc is not easily generated.

In general, when the content by percentage of an Ar gas in a shielding gas is low, an attempt for generating a spray arc is made by increasing the current value of the pulse current. However, when the pulse current is a pulse current made of ordinary rectangular waves or trapezoidal waves (see 20 in FIG. 2), the pulse area becomes too large only by increasing the value of the current. Thus, when the current is applied to high-rate welding, weld defects, such as a cut, are easily generated at ends of the bead.

Thus, in the present invention, the pulse as described above is used as the welding current, whereby the arc generation position is rendered a high position of a side of the solid wire (position far from the tip of the solid wire) according to the pulse current in the first peak term Tp1, so that an appropriate pinching force is allowed to act onto the whole of the melted droplet formed around the tip of the solid wire. Moreover, in the invention, the second peak term Tp2 is set into the pulse current, thereby avoiding a matter that the pulse area for each of the cycles becomes excessive to avoid the generation of weld defects such as a cut.

(First Peak)

In order to allow the pinching force to act appropriately onto the whole of the melted droplet formed around the tip of the solid wire in the first peak term Tp1, it is necessary to generate arc at a base-end-side position of the wire rather than the tip of the wire (liquefaction start moiety of the wire), that is, a high position of a side of the wire (position far from the tip of the solid wire). If the current value Ip1 of the first peak of the pulse current is less than 440 A, arc is not generated from a sufficiently high position of the side of the wire. Contrarily, if the current value Tp1 of the first peak is more than 500 A, the side of the wire is excessively melted. Accordingly, the current value Ip1 of the first current ranges preferably from 440 to 500 A.

The first peak term Tp1 is a term necessary for tightening the upper part of the side of the melted droplet formed around the wire tip by pinching force. Thus, if the term is less than 0.2 ms, a period when the melted droplet is tightened by the pinching force cannot be ensured. Contrarily, if the term is more than 0.6 ms, the melted droplet elongates excessively so that a short circuit for causing the generation of spatters is easily caused. Thus, the first peak term Tp1 ranges preferably from 0.2 to 0.6 ms.

(Second Peak)

In the second peak term Tp2, the middle- or lower-position melted droplet part of the melted droplet formed around the wire tip is enveloped in arc, and then separated appropriately from the other part by the pinching force. If the current value IP2 of the second peak is less than 300 A, spray arc is not easily generated. Thus, the welding-environment turns into a state where arc is generated from the bottom part of the melted droplet formed around the wire tip. Thus, a good droplet transfer is not attained. Contrarily, if the current value is more than 400 A, the value is not different from that of the first peak so that the entire current value (average current value) becomes high. In short, the pulse area becomes excessive. Accordingly, when the pulse current is applied to high-rate welding, weld defects such as a cut are easily generated at the bead ends. Thus, the current value Ip2 of the second peak ranges preferably from 300 to 400 A.

If the second peak term Tp2 is less than 0.2 ms, a period when the melted droplet is tightened by the pinching force cannot be ensured. Contrarily, if the term is more than 0.6 ms, the melted droplet elongates excessively so that a short circuit for causing the generation of spatters is easily caused. Thus, the second peak term Tp2 ranges preferably from 0.2 to 0.6 ms.

The shift term Tsf for which the pulse current shifts from the first peak to the second peak ranges preferably from 0.2 to 0.6 ms as in the first peak term Tp1 so as not to make the pulse area too large.

The base term Tb, and the value Ib of a base current therein are not particularly limited. The current value Ib ranges preferably from 20 to 80 A; and the term Tb ranges preferably from 0.5 to 20 ms.

The peak rising-up term Tup and the peak falling-down term Tdn are not also particularly limited. The term Tup ranges preferably from 0.4 to 0.8 ms; and the term Tdn preferably from 0.4 to 1.2 ms.

Referring to FIG. 2, a description will be made hereinafter about the state of a melted droplet formed around the tip of the solid wire 1 when the above-mentioned pulse current is used.

In the first peak term Tp1, a punching force acts onto the whole of a melted droplet 4 formed around the tip of the solid wire 1 (see FIG. 2(a)). In the second peak term Tp2, the middle- or lower-position melted droplet 4 part of the melted droplet 4 formed around the tip of the solid wire 1 is enveloped in arc, and turned into a state just before separated from the other part by the pinching force (see FIG. 2(b)). In the peak falling-down term Tdn after the second peak term Tp2, a spherical melted droplet 5 is separated from the melted droplet 4 formed around the tip of the solid wire 1 (see FIG. 2(c)). Thereafter, in the base term Tb, the separated melted droplet 5 shifts to a weld region (see FIG. 2(d)).

(Pulse Current Having Two Pulse Periods)

Figure 3:
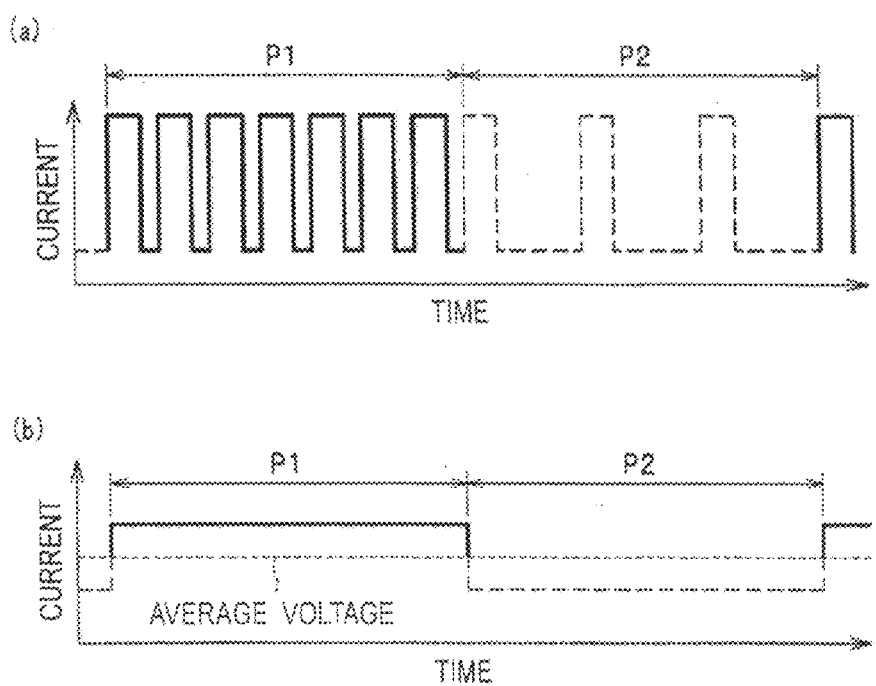
FIG. 3 are each a waveform chart of a pulse current/voltage having two pulse periods, which is used in gas-shielded arc welding according to the invention.

As illustrated in FIG. 3(a), the pulse current is preferably a pulse current generated by repeating, alternately at a predetermined frequency, a first period P1 in which one pulse cycle is densely and continuously recurred, and a second period P2 in which one pulse cycle is thinly and continuously recurred. In other words, the pulse current is preferably a pulse current generated by repeating, alternately at a predetermined frequency, a first period P1 in which one pulse cycle that is a predetermined period is densely and continuously recurred, and a second period P2 in which one pulse cycle that is longer than the predetermined period is thinly and continuously recurred.

A brief description is first made about the reasons why the pulse current as described above is used as the welding current.

In order to utilize arc heat to evaporate positively galvanization on the melted region just below the solid wire, a large current for making the arc power large should be used as the welding current. However, the current value of the welding current is in substantial proportion to the rate of feeding the wire. This wire feed rate needs to be set, considering a relationship with the melted amount for bonding which is decided by the welding rate and the cross section of the bead. It is therefore impossible that only the current value of the welding current is simply made large freely.

Thus, in the present invention, the pulse current as described above is used as the welding current, thereby making it possible to increase the welding current in the first period P1 and decrease that in the second period P2 without changing the average welding current. Consequently, in the first period P1, a large arc power makes it possible to push away the melted metal just below the solid wire to dig the melted region more deeply. Additionally, by repeating the welding current in the first period P1 and that in the second period P2 alternately, the melted metal that is being solidified can be periodically vibrated. The vibration makes it possible to release the zinc gas 3 enveloped in the melted region outward.

(First Period and Second Period)

If the frequency at which the first period P1 and the second period P2 are repeated is less than 5 Hz, the second period P2, in which one pulse cycle is thinly and continuously recurred, becomes long so that appropriate evaporation of the galvanization is not easily promoted in this period. Moreover, uneven ripples come forth in the external appearance of the bead.

Contrarily, if this frequency is more than 30 Hz, the term for the switching is too short, whereby the first period P1, in which one pulse cycle is densely and continuously recurred, is short so that appropriate evaporation of the galvanization is not easily promoted. Moreover, the melted metal that is being solidified cannot be sufficiently vibrated to reduce the effect of releasing bubbles enveloped in the welding metal outward from the melted metal.

It is therefore preferred that the pulse current is a current generated by repeating the first period P1 and the second period P2 at a frequency of 5 to 30 Hz. In other words, the pulse current is preferably a current generated by repeating one cycle composed of the first period P1 and the second period P2 at a frequency of 5 to 30 Hz.

As shown in FIG. 3(b), the voltage in the first period P1 and the second period P2 fluctuates.

The length of each of the pulse cycles is not particularly limited. Preferably, the pulse cycle in the first period P1 ranges from 2 to 25 ms; and the pulse cycle in the second period P2 ranges from 2 to 25 ms.

The pulse current may be a current that is generated by repeating, alternately at a predetermined frequency, the first period P1 in which one pulse cycle is densely and continuously recurred and the second period P2 in which one pulse cycle is thinly and continuously recurred, and may be a current in which each of the pulse cycles in the first period P1 and those in the second period P2 is composed of electric conductions as described above, i.e., an electric conduction for the first peak, an electric conduction for the second peak, and an electric conduction of the base current.

EXAMPLES

The following will describe the solid wire and gas-shielded arc welding method using this wire according to the present invention by demonstrating examples satisfying the requirements of the invention, and comparative examples not satisfying the requirements.

(Solid Wires and Shielding Gases)

Used solid wires were wires each having composition shown in Table 1 (wires Nos. W1 to W42).

TABLE 1

| Wire No. | Chemical composition in whole wire mass (%) | | | | | | | | | | | | | | Si + Mn 100(S + O) | Mn/Si |
|---|---|---|---|---|---|---|---|---|---|---|---|---|---|---|---|---|
| | C | Si | Mn | P | S | Cr | Cu | Al | Ti | Nb | Zr | Mo | N | O | | |
| W1 | 0.03 | 0.62 | 1.12 | 0.0022 | 0.0042 | 0.28 | 0.21 | 0.005 | 0.011 | 0.007 | 0.005 | 0.004 | 0.0038 | 0.0042 | 2.1 | 1.8 |
| W2 | 0.04 | 0.71 | 1.15 | 0.0024 | 0.0046 | 0.02 | 0.23 | 0.005 | 0.008 | 0.006 | 0.005 | 0.003 | 0.0041 | 0.0052 | 1.9 | 1.6 |
| W3 | 0.03 | 0.72 | 1.34 | 0.0042 | 0.0076 | 0.06 | 0.22 | 0.004 | 0.009 | 0.007 | 0.005 | 0.005 | 0.0039 | 0.0049 | 1.6 | 1.9 |
| W4 | 0.02 | 0.57 | 1.15 | 0.0023 | 0.0013 | 0.05 | 0.21 | 0.005 | 0.009 | 0.006 | 0.006 | 0.006 | 0.0047 | 0.0049 | 2.8 | 2.0 |
| W5 | 0.03 | 0.61 | 1.11 | 0.0037 | 0.0042 | 0.92 | 0.22 | 0.006 | 0.007 | 0.008 | 0.006 | 0.006 | 0.0041 | 0.0054 | 1.8 | 1.8 |
| W6 | 0.15 | 0.60 | 1.05 | 0.0014 | 0.0038 | 0.12 | 0.22 | 0.005 | 0.006 | 0.005 | 0.005 | 0.008 | 0.0039 | 0.0048 | 1.9 | 1.8 |
| W7 | 0.01 | 0.88 | 1.12 | 0.0028 | 0.0046 | 0.08 | 0.21 | 0.005 | 0.005 | 0.004 | 0.005 | 0.008 | 0.0052 | 0.0049 | 2.1 | 1.3 |
| W8 | 0.03 | 0.44 | 0.89 | 0.0038 | 0.0044 | 0.08 | 0.22 | 0.005 | 0.005 | 0.005 | 0.005 | 0.006 | 0.0054 | 0.0048 | 1.4 | 2.0 |
| W9 | 0.03 | 0.58 | 1.17 | 0.0046 | 0.0072 | 0.07 | 0.24 | 0.008 | 0.006 | 0.008 | 0.006 | 0.009 | 0.0046 | 0.0092 | 1.1 | 2.0 |
| W10 | 0.04 | 0.75 | 1.42 | 0.0047 | 0.0056 | 0.08 | 0.21 | 0.006 | 0.007 | 0.008 | 0.006 | 0.008 | 0.0051 | 0.0057 | 1.9 | 1.9 |
| W11 | 0.04 | 0.45 | 0.24 | 0.0027 | 0.0046 | 0.08 | 0.22 | 0.004 | 0.008 | 0.007 | 0.004 | 0.004 | 0.0061 | 0.0021 | 1.0 | 0.5 |
| W12 | 0.04 | 0.61 | 1.21 | 0.0032 | 0.0048 | 0.07 | 2.89 | 0.009 | 0.009 | 0.006 | 0.006 | 0.007 | 0.0073 | 0.0061 | 1.7 | 2.0 |
| W13 | 0.03 | 0.68 | 1.18 | 0.0048 | 0.0047 | 0.07 | 0.02 | 0.006 | 0.007 | 0.008 | 0.008 | 0.008 | 0.0062 | 0.0052 | 1.9 | 1.7 |
| W14 | 0.03 | 0.58 | 1.11 | 0.0024 | 0.0077 | 0.06 | 0.22 | 0.472 | 0.008 | 0.008 | 0.007 | 0.006 | 0.0077 | 0.0031 | 1.6 | 1.9 |
| W15 | 0.04 | 0.62 | 1.24 | 0.0024 | 0.0052 | 0.08 | 0.27 | 0.120 | 0.487 | 0.007 | 0.006 | 0.006 | 0.0081 | 0.0052 | 1.8 | 2.0 |
| W16 | 0.04 | 0.72 | 1.29 | 0.0057 | 0.0042 | 0.11 | 0.21 | 0.006 | 0.210 | 0.477 | 0.007 | 0.007 | 0.0163 | 0.0042 | 2.4 | 1.8 |
| W17 | 0.03 | 0.58 | 1.18 | 0.0037 | 0.0049 | 0.09 | 0.21 | 0.006 | 0.012 | 0.009 | 0.486 | 0.005 | 0.0082 | 0.0052 | 1.7 | 2.0 |
| W18 | 0.04 | 0.66 | 1.22 | 0.0482 | 0.0043 | 0.07 | 0.23 | 0.008 | 0.008 | 0.011 | 0.006 | 0.006 | 0.0056 | 0.0048 | 2.1 | 1.8 |
| W19 | 0.03 | 0.64 | 1.29 | 0.0033 | 0.0053 | 0.12 | 0.21 | 0.008 | 0.007 | 0.007 | 0.006 | 0.092 | 0.0047 | 0.0055 | 1.8 | 2.0 |
| W20 | 0.03 | 0.52 | 1.03 | 0.0031 | 0.0032 | 0.42 | 0.22 | 0.007 | 0.004 | 0.006 | 0.008 | 0.011 | 0.0052 | 0.0037 | 2.2 | 2.0 |
| W21 | 0.06 | 0.55 | 1.03 | 0.0049 | 0.0021 | 0.07 | 0.21 | 0.006 | 0.008 | 0.007 | 0.008 | 0.008 | 0.0062 | 0.0039 | 2.6 | 1.9 |
| W22 | 0.06 | 0.56 | 1.05 | 0.0140 | 0.0020 | 0.07 | 0.21 | 0.008 | 0.005 | 0.009 | 0.006 | 0.007 | 0.0058 | 0.0042 | 2.6 | 1.9 |
| W23 | 0.06 | 0.62 | 1.06 | 0.0260 | 0.0021 | 0.08 | 0.22 | 0.008 | 0.006 | 0.007 | 0.006 | 0.007 | 0.0062 | 0.0049 | 2.4 | 1.7 |
| W24 | 0.07 | 0.82 | 0.62 | 0.0170 | 0.0020 | 0.07 | 0.22 | 0.009 | 0.007 | 0.491 | 0.007 | 0.007 | 0.0072 | 0.0034 | 2.7 | 0.8 |
| W25 | 0.14 | 0.68 | 1.04 | 0.0020 | 0.0020 | 0.06 | 0.22 | 0.008 | 0.007 | 0.008 | 0.007 | 0.008 | 0.0058 | 0.0036 | 3.1 | 1.5 |
| W26 | 0.07 | 0.55 | 1.06 | 0.0140 | 0.0030 | 0.07 | 0.21 | 0.008 | 0.300 | 0.009 | 0.007 | 0.008 | 0.0061 | 0.0018 | 3.4 | 1.9 |
| W27 | 0.08 | 0.55 | 1.12 | 0.0072 | 0.0140 | 0.05 | 0.21 | 0.005 | 0.041 | 0.008 | 0.009 | 0.004 | 0.0037 | 0.0057 | 0.8 | 2.0 |
| W28 | 0.06 | 0.89 | 0.24 | 0.0043 | 0.0020 | 0.05 | 0.21 | 0.005 | 0.008 | 0.008 | 0.008 | 0.004 | 0.0034 | 0.0052 | 1.6 | 0.3 |
| W29 | 0.05 | 0.05 | 1.05 | 0.0063 | 0.0023 | 0.05 | 0.22 | 0.006 | 0.004 | 0.007 | 0.007 | 0.005 | 0.0048 | 0.0061 | 1.3 | 21.0 |
| W30 | 0.06 | 0.05 | 2.09 | 0.0021 | 0.0033 | 0.06 | 0.21 | 0.008 | 0.007 | 0.009 | 0.007 | 0.008 | 0.0068 | 0.0038 | 3.0 | 41.8 |
| W31 | 0.02 | 0.91 | 1.36 | 0.0050 | 0.0570 | 0.01 | 0.21 | 0.005 | 0.008 | 0.008 | 0.007 | 0.007 | 0.0059 | 0.0051 | 0.4 | 1.5 |
| W32 | 0.05 | 0.55 | 0.57 | 0.0049 | 0.0096 | 0.02 | 0.22 | 0.006 | 0.008 | 0.008 | 0.008 | 0.008 | 0.0061 | 0.0054 | 0.7 | 1.0 |
| W33 | 0.06 | 0.32 | 1.22 | 0.0055 | 0.0072 | 1.21 | 0.22 | 0.007 | 0.007 | 0.008 | 0.008 | 0.007 | 0.0057 | 0.0035 | 1.4 | 3.8 |
| W34 | 0.05 | 0.35 | 1.32 | 0.0043 | 0.0078 | 0.04 | 3.25 | 0.008 | 0.006 | 0.007 | 0.008 | 0.006 | 0.0053 | 0.0042 | 1.4 | 3.8 |
| W35 | 0.06 | 0.84 | 0.35 | 0.0142 | 0.0265 | 0.05 | 0.21 | 0.120 | 0.008 | 0.008 | 0.009 | 0.008 | 0.0063 | 0.0043 | 0.4 | 0.4 |
| W36 | 0.06 | 0.47 | 0.19 | 0.0053 | 0.0098 | 0.03 | 0.22 | 0.122 | 0.072 | 0.008 | 0.008 | 0.007 | 0.0062 | 0.0039 | 0.5 | 0.4 |
| W37 | 0.03 | 0.62 | 1.22 | 0.0038 | 0.0143 | 0.03 | 0.22 | 0.005 | 0.210 | 0.008 | 0.672 | 0.008 | 0.0064 | 0.0051 | 0.9 | 2.0 |
| W38 | 0.04 | 0.61 | 0.94 | 0.0052 | 0.0172 | 0.04 | 0.22 | 0.005 | 0.220 | 0.007 | 0.008 | 5.440 | 0.0067 | 0.0039 | 0.7 | 1.5 |
| W39 | 0.06 | 1.22 | 2.23 | 0.0058 | 0.0089 | 0.03 | 0.23 | 0.006 | 0.310 | 0.010 | 0.007 | 0.009 | 0.0059 | 0.0045 | 2.6 | 1.8 |
| W40 | 0.06 | 0.81 | 1.44 | 0.0690 | 0.0034 | 0.03 | 0.22 | 0.005 | 0.007 | 0.006 | 0.006 | 0.007 | 0.0068 | 0.0039 | 3.1 | 1.8 |
| W41 | 2.23 | 1.88 | 2.23 | 0.0052 | 0.0035 | 0.04 | 0.21 | 0.007 | 0.008 | 0.007 | 0.008 | 0.005 | 0.0054 | 0.0039 | 5.6 | 1.2 |
| W42 | 0.06 | 0.72 | 1.21 | 0.0049 | 0.0088 | 0.03 | 0.21 | 0.005 | 0.005 | 0.008 | 0.005 | 0.007 | 0.0044 | 0.0123 | 0.9 | 1.7 |

The solid wires except Test Specimen No. 13 (wire No. W13) in Table 1 each had surfaces plated with Cu (the amount of Cu was 0.20% by mass of the whole mass of the wire). Wires Nos. in Tables 2A to 5 listed below correspond to the wires Nos. in Table 1. The respective compositions of used shielding gases are shown in Tables 2A to 5.

(Base Metal Members)

Figure 4:
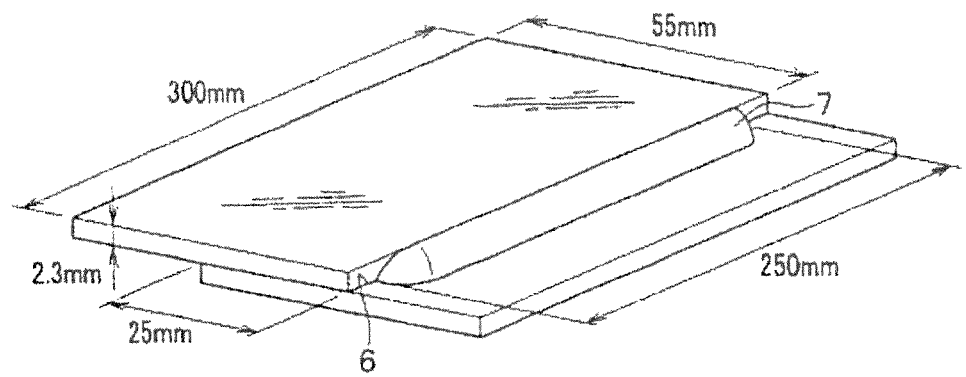
FIG. 4 shows a base metal member used at the time of gas-shielded arc welding in working examples according to the invention.

Used base metal members were each an SGCC (galvanized steel sheets) in accordance with JIS G 3302 in which the coating weight of its galvanization was 45 g/m$^2$. As illustrated in FIG. 4, in each pair composed of two of the galvanized steel sheets (300 mm×55 mm×2.3 mm), the two steel sheets were shifted from each other by 25 mm, and put onto each other. The sheets were bonded onto each other by spot welding (temporary bonding), with a weld gap of 0 mm, to create a condition that porosity defects would be easily generated.

(Arc Welding Conditions)

Figure 5:
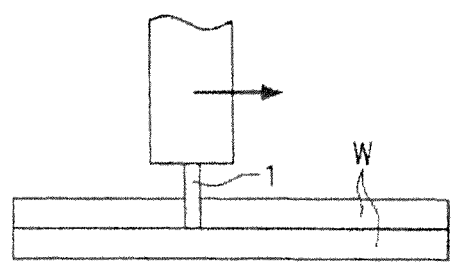
FIG. 5 are each a schematic view demonstrating a wire-shift performed at the time of the gas-shielded arc welding in the working examples according to the invention.
Figure 5:
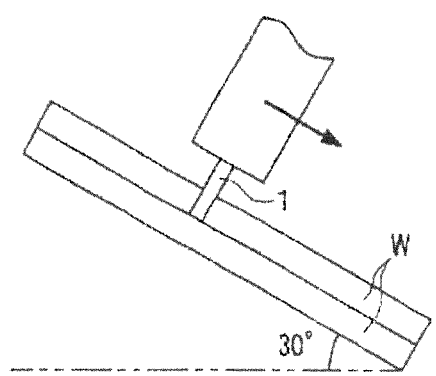

As illustrated in FIG. 4, each of the pairs was subjected to welding by a method of subjecting an edge 6 of one of the paired-spot-welded base metal members to lap welding (length: 250 mm). In this way, a bead 7 as shown in FIG. 4 was formed. Regarding each of Test Specimens No. 1 to 201 described in Tables 2A to 5, the welding was performed in the state where a downhill-welding position (angle to the horizontal surface: 30°) illustrated in FIG. 5(b) was adopted and the torch angle onto the base metal member surfaces was a right angle.

Regarding Test Specimens Nos. 1 to 85 described in Tables 2A to 3, detailed conditions were as follows for the average current/voltage, the distance between the base metal member and chip, the flow rate (of the shielding gas), the welding rate, and the wire feed rate.

In the case of using solid wires having a wire diameter of 0.6 to 0.7 mm, the welding was performed under the following conditions: the average current/voltage: 200 to 220 A/29 to 30 V, the distance between the base metal member and the chip: 15 mm, the flow rate: 25 L/min, the welding rate: 100 cm/min, and the wire feed rate: 1500 cm/min.

In the case of using solid wires having a wire diameter of 0.8 to 1.0 mm, the welding was performed under the following conditions: the average current/voltage: 210 to 230 A/27 to 29 V, the distance between the base metal member and the chip: 15 mm, the flow rate: 25 L/min, the welding rate: 100 cm/min, and the wire feed rate: 1100 cm/min.

In the case of using solid wires having a wire diameter of 1.2 to 1.4 mm, the welding was performed under the following conditions: the average current/voltage: 220 to 240 A/23 to 25 V, the distance between the base metal member and the chip: 15 mm, the flow rate: 25 L/min, the welding rate: 100 cm/min, and the wire feed rate: 700 cm/min.

In the case of using solid wires having a wire diameter of 1.6 mm, the welding was performed under the following conditions: the average current/voltage: 230 to 250 A/21 to 23 V, the distance between the base metal member and the chip: 15 mm, the flow rate: 25 L/min, the welding rate: 100 cm/min, and the wire feed rate: 500 cm/min.

Figure 6:
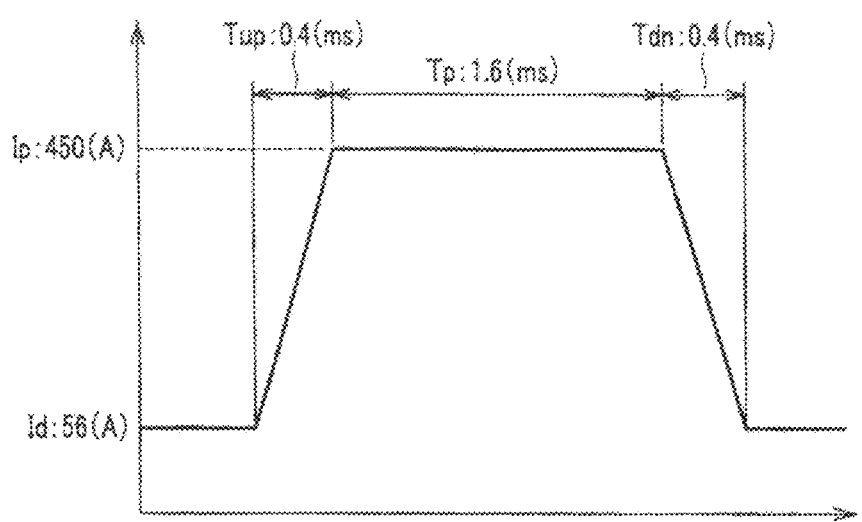
FIG. 6 is a waveform chart of a pulse current used in the gas-shielded arc welding in the working examples according to the invention.

The pulse waveform of the pulse current used as the welding current was specifically a waveform shown in FIG. 6. When the content by percentage of $CO_2$ gas in the shielding gas was from 25 to 40%, the applied voltage was made 1 V higher than the above-mentioned voltages to perform the welding. When the content by percentage was more than 40%, the applied voltage was made 2 V higher to perform the welding.

Regarding Test Specimens Nos. 86 to 165 described in Tables 4A and 4B, detailed conditions were as follows for the base current value, the voltage, the distance between the base metal member and the chip, the flow rate (of the shielding gas), the welding rate, and the wire feed rate.

In the case of using solid wires having a wire diameter of 1.0 mm, the welding was performed under the following conditions: the base current/voltage: 40 A/26 to 28 V, the distance between the base metal member and the chip: 15 mm, the flow rate: 25 L/min, the welding rate: 100 cm/min, and the wire feed rate: 1000 cm/min.

In the case of using solid wires having a wire diameter of 0.7 mm, the welding was performed under the following conditions: the base current/voltage: 40 A/25 to 27 V, the distance between the base metal member and the chip: 12 mm, the flow rate: 25 L/min, the welding rate: 100 cm/min, and the wire feed rate: 2000 cm/min.

When the content by percentage of $CO_2$ gas in the shielding gas was 40%, the applied voltage was made 1 V higher than the above-mentioned voltages to perform the welding.

Regarding Test Specimens Nos. 166 to 201 described in Table 5, detailed conditions were as follows for the first period/second period voltages, the distance between the base metal member and the chip, the flow rate (of the shielding gas), the welding rate, and the wire feed rate.

In the case of using solid wires having a wire diameter of 1.0 mm, the welding was performed under the following conditions: the first period/second period voltages: 28 V/26 V, the distance between the base metal member and the chip: 15 mm, the flow rate: 25 L/min, the welding rate: 100 cm/min, and the wire feed rate: 1000 cm/min.

In the case of using solid wires having a wire diameter of 0.7 mm, the welding was performed under the following conditions: the first period/second period voltages: 27 V/25 V, the distance between the base metal member and the chip: 12 mm, the flow rate: 25 L/min, the welding rate: 100 cm/min, and the wire feed rate: 2000 cm/min.

When the content by percentage of $CO_2$ gas in the shielding gas was 40%, the applied voltage was made 1 V higher than the above-mentioned voltages to perform the welding.

(Pit Measuring Method, and Evaluating Criterion)

Each of the specimens was measured about pits therein with the naked eye. The number of the pits in the 250-mm-length bead was counted. The average was calculated out from respective values measured two times. This average was used to evaluate the specimen.

In the case of a standard gas (Ar+20% $CO_2$ gas), the number of pits was 5.5/250-mm (see Test Specimen No. 53 in Table 2B). In light of this, when the number was 5.0 or less (not including 0), the specimen was judged to be good (◯) since the specimen was considered to have an effect of improving the pore-resisting performance; when the number was 0, the specimen to be very good (◉); or when the number was more than 5.0, the specimen to be bad (x).

(Blowhole Measuring Method, and Evaluating Criterion)

Each of the specimens was measured about blowholes therein by a method in accordance with a radiographic test (RT; see JIS Z 3104). The number of the blowholes in the 250-mm-length bead was counted. The average was calculated out from respective values measured two times. This average was used to evaluate the specimen.

In the case of a standard gas (Ar+20% $CO_2$ gas), the number of blowholes was 31.0/250-mm (see Test Specimen No. 53 in Table 2B). In light of this, when the number was more than 20.0 and 30.0 or less, the specimen was judged to be relatively good (Δ) since the specimen was considered to have a predetermined effect of improving the pore-resisting performance (was recognizable to have an effect somewhat greater than specimens in the prior art); when the number was 20.0 or less (not including 0), the specimen to be good (○) since the specimen was considered to have an effect of improving the pore-resisting performance; or when the number was 0, the specimen to be very good (⊚).

If the number was more than 30.0, the specimen was judged to be bad (x).

(Method for Measuring Spatter Amount and Criterion for Evaluating the Same)

In order to measure spatter-generation in each of the specimens, the specimen was welded in a box made of copper plates and having a height of 300 mm, a width of 300 mm and a length of 450 mm, and all spatters generated for 1 minute were collected from the box. The whole mass of the collected spatters was measured to be defined as the spatter amount (g/min).

When the spatter amount is more than 1.80 g/min, many spatters are apparently scattered. Thus, when the amount was more than 1.50 g/min but was 1.80 g/min or less, a predetermined spatter-restraining effect was recognized. Thus, in this case, the specimen was judged to be relatively good (Δ). When the spatter amount was 1.50 g/min or less, the specimen was judged to be good (○); or when the spatter amount was not more than 0.75 g/min, which was ½ of the amount 1.50 g/min, the specimen to be very good (⊚). If the spatter amount was more than 1.80 g/min, the specimen was judged to be bad (x).

(Method for Measuring Slag Coverage Ratio and Criterion for Evaluating the Same)

Each of the specimens was photographed with a digital camera about the external appearance of the bead (over the length 250 mm of the bead) thereof. The resultant image was binarized to divide the external appearance to slags and the metal surface. From the respective areas thereof, the slag coverage ratio was measured. When the coverage ratio was more than 15%, the specimen was judged to be bad (x) since the external appearance of the bead was bad, or when the ratio was 15% or less, the specimen was judged to be good (○).

(Method for Checking External Appearance of Bead and Criterion for Evaluating the Same)

Each of the specimens was checked with the naked eye about the external appearance of the bead thereof. It was checked whether or not the bead surface had a weld defect, such as meandering, humping or an undercut, and had a slag coverage. When the bead surface had a weld defect or slag coverage as described above, the specimen was judged to be bad (x), or when the bead surface had neither weld defect nor slag coverage, the specimen was judged to be good (○). The criterion as to whether or not the bead surface had the slag coverage was according to the above-mentioned criterion (the bead surface was judged to have the slag coverage when the ratio was more than 15%).

Tables 2A to 5 show results obtained by using the individual solid wires to perform the welding operations under the predetermined conditions. In the tables, any underline shows that the requirements of the present invention are not satisfied. In the tables, the wording "Ar+numerical-value $CO_2$" shows an Ar—$CO_2$ gas composed of $CO_2$ in a proportion (%) represented by the numerical-value, and Ar gas as the balance. In the tables, the wording "wave frequency" shows the frequency at which the first period (period in which one pulse cycle was densely and continuously recurred) and the second period (period in which one pulse cycle was thinly and continuously recurred) as one cycle were repeated.

TABLE 2A

| Test specimen No. | Wire No. | Wire diameter (mm) | Shielding gas | The number of pits (/250-mm) | | The number of blowholes (/250-mm) | | Spatters (g/min) | | Slag coverage ratio (%) | | External appearance of bead | |
|---|---|---|---|---|---|---|---|---|---|---|---|---|---|
| 1 | W1 | 1.2 | Ar + 25$CO_2$ | 0.5 | ○ | 0.28 | ○ | 0.99 | ○ | 2.3 | ○ | ○ | Example |
| 2 | W2 | 1.2 | Ar + 25$CO_2$ | 1.0 | ○ | 12.0 | ○ | 1.12 | ○ | 3.4 | ○ | ○ | Example |
| 3 | W3 | 1.2 | Ar + 25$CO_2$ | 3.0 | ○ | 18.0 | ○ | 1.37 | ○ | 4.7 | ○ | ○ | Example |
| 4 | W4 | 1.2 | Ar + 25$CO_2$ | 0.5 | ○ | 7.0 | ○ | 0.96 | ○ | 5.2 | ○ | ○ | Example |
| 5 | W5 | 1.2 | Ar + 25$CO_2$ | 0.5 | ○ | 12.0 | ○ | 1.14 | ○ | 6.8 | ○ | ○ | Example |
| 6 | W6 | 1.2 | Ar + 25$CO_2$ | 1.0 | ○ | 13.0 | ○ | 1.42 | ○ | 3.8 | ○ | ○ | Example |
| 7 | W7 | 1.2 | Ar + 25$CO_2$ | 2.5 | ○ | 16.0 | ○ | 1.13 | ○ | 6.2 | ○ | ○ | Example |
| 8 | W8 | 1.2 | Ar + 25$CO_2$ | 0.0 | ⊚ | 8.0 | ○ | 1.02 | ○ | 6.9 | ○ | ○ | Example |
| 9 | W9 | 1.2 | Ar + 25$CO_2$ | 4.0 | ○ | 16.0 | ○ | 1.23 | ○ | 6.7 | ○ | ○ | Example |
| 10 | W10 | 1.2 | Ar + 25$CO_2$ | 1.0 | ○ | 9.5 | ○ | 1.31 | ○ | 8.5 | ○ | ○ | Example |
| 11 | W11 | 1.2 | Ar + 25$CO_2$ | 2.0 | ○ | 10.0 | ○ | 1.09 | ○ | 3.4 | ○ | ○ | Example |
| 12 | W12 | 1.2 | Ar + 25$CO_2$ | 2.5 | ○ | 12.0 | ○ | 1.11 | ○ | 4.8 | ○ | ○ | Example |
| 13 | W13 | 1.2 | Ar + 25$CO_2$ | 2.0 | ○ | 11.0 | ○ | 0.92 | ○ | 5.1 | ○ | ○ | Example |
| 14 | W14 | 1.2 | Ar + 25$CO_2$ | 1.0 | ○ | 9.0 | ○ | 1.45 | ○ | 9.7 | ○ | ○ | Example |
| 15 | W15 | 1.2 | Ar + 25$CO_2$ | 1.5 | ○ | 7.0 | ○ | 1.22 | ○ | 11.2 | ○ | ○ | Example |
| 16 | W16 | 1.2 | Ar + 25$CO_2$ | 4.0 | ○ | 7.0 | ○ | 1.31 | ○ | 8.5 | ○ | ○ | Example |
| 17 | W17 | 1.2 | Ar + 25$CO_2$ | 3.0 | ○ | 8.5 | ○ | 1.21 | ○ | 10.5 | ○ | ○ | Example |
| 18 | W18 | 1.2 | Ar + 25$CO_2$ | 1.5 | ○ | 7.0 | ○ | 1.33 | ○ | 6.2 | ○ | ○ | Example |
| 19 | W19 | 1.2 | Ar + 25$CO_2$ | 1.0 | ○ | 11.0 | ○ | 1.22 | ○ | 5.7 | ○ | ○ | Example |
| 20 | W20 | 1.2 | Ar + 25$CO_2$ | 0 | ⊚ | 8.0 | ○ | 1.24 | ○ | 7.2 | ○ | ○ | Example |
| 21 | W21 | 1.2 | Ar + 25$CO_2$ | 2.5 | ○ | 16.0 | ○ | 1.32 | ○ | 4.8 | ○ | ○ | Example |
| 22 | W22 | 1.2 | Ar + 25$CO_2$ | 1.5 | ○ | 12.0 | ○ | 1.22 | ○ | 4.2 | ○ | ○ | Example |
| 23 | W23 | 1.2 | Ar + 25$CO_2$ | 2.0 | ○ | 11.5 | ○ | 1.21 | ○ | 3.8 | ○ | ○ | Example |
| 24 | W24 | 1.2 | Ar + 25$CO_2$ | 5.0 | ○ | 12.0 | ○ | 1.28 | ○ | 4.1 | ○ | ○ | Example |
| 25 | W25 | 1.2 | Ar + 25$CO_2$ | 2.5 | ○ | 8.0 | ○ | 1.28 | ○ | 4.8 | ○ | ○ | Example |
| 26 | W26 | 1.2 | Ar + 25$CO_2$ | 3.0 | ○ | 9.0 | ○ | 1.38 | ○ | 3.8 | ○ | ○ | Example |
| 27 | W1 | 1.2 | Ar + 30$CO_2$ | 0 | ⊚ | 2.0 | ○ | 1.22 | ○ | 3.9 | ○ | ○ | Example |
| 28 | W1 | 1.2 | Ar + 35$CO_2$ | 0 | ⊚ | 1.5 | ○ | 1.28 | ○ | 4.2 | ○ | ○ | Example |
| 29 | W1 | 1.2 | Ar + 40$CO_2$ | 0 | ⊚ | 2.0 | ○ | 1.47 | ○ | 4.8 | ○ | ○ | Example |

TABLE 2A-continued

| Test specimen No. | Wire No. | Wire diameter (mm) | Shielding gas | The number of pits (/250-mm) | | The number of blowholes (/250-mm) | | Spatters (g/min) | | Slag coverage ratio (%) | | External appearance of bead | |
|---|---|---|---|---|---|---|---|---|---|---|---|---|---|
| 30 | W2 | 1.2 | Ar + 35CO$_2$ | 0 | ◎ | 2.0 | ○ | 1.36 | ○ | 4.7 | ○ | ○ | Example |
| 31 | W3 | 1.2 | Ar + 35CO$_2$ | 0 | ◎ | 3.0 | ○ | 1.22 | ○ | 5.8 | ○ | ○ | Example |
| 32 | W4 | 1.2 | Ar + 35CO$_2$ | 0 | ◎ | 2.0 | ○ | 1.38 | ○ | 4.2 | ○ | ○ | Example |

TABLE 2B

| Test specimen No. | Wire No. | Wire diameter (mm) | Shielding gas | The number of pits (/250-mm) | | The number of blowholes (/250-mm) | | Spatters (g/min) | | Slag coverage ratio (%) | | External appearance of bead | |
|---|---|---|---|---|---|---|---|---|---|---|---|---|---|
| 33 | W27 | 1.2 | Ar + 25CO$_2$ | 12.0 | X | 0.3 | X | 1.42 | ○ | 5.6 | ○ | ○ | Comparative Example |
| 34 | W28 | 1.2 | Ar + 25CO$_2$ | 5.0 | ○ | 31.5 | X | 1.38 | ○ | 5.9 | ○ | ○ | Comparative Example |
| 35 | W29 | 1.2 | Ar + 25CO$_2$ | 3.0 | ○ | 13.0 | ○ | 1.41 | ○ | 21.5 | X | X | Comparative Example |
| 36 | W30 | 1.2 | Ar + 25CO$_2$ | 4.0 | ○ | 9.0 | ○ | 1.27 | ○ | 24.4 | X | X | Comparative Example |
| 37 | W31 | 1.2 | Ar + 25CO$_2$ | 43.5 | X | 68.0 | X | 2.88 | X | 8.2 | ○ | ○ | Comparative Example |
| 38 | W32 | 1.2 | Ar + 25CO$_2$ | 14.0 | X | 35.0 | X | 1.36 | ○ | 7.6 | ○ | ○ | Comparative Example |
| 39 | W33 | 1.2 | Ar + 25CO$_2$ | 4.0 | ○ | 19.0 | ○ | 1.42 | ○ | 15.8 | X | X | Comparative Example |
| 40 | W34 | 1.2 | Ar + 25CO$_2$ | — | — | — | — | — | — | — | — | — | Comparative Example |
| 41 | W35 | 1.2 | Ar + 25CO$_2$ | 24.0 | X | 43.0 | X | 1.39 | ○ | 8.5 | ○ | ○ | Comparative Example |
| 42 | W36 | 1.2 | Ar + 25CO$_2$ | 15.0 | X | 34.0 | X | 1.43 | ○ | 7.4 | ○ | ○ | Comparative Example |
| 43 | W37 | 1.2 | Ar + 25CO$_2$ | 9.0 | X | 32.0 | X | 1.88 | X | 16.8 | X | X | Comparative Example |
| 44 | W38 | 1.2 | Ar + 25CO$_2$ | 14.0 | X | 44.0 | X | 1.32 | ○ | 6.9 | ○ | X | Comparative Example |
| 45 | W39 | 1.2 | Ar + 25CO$_2$ | 2.0 | ○ | 8.0 | ○ | 1.38 | ○ | 15.4 | X | X | Comparative Example |
| 46 | W40 | 1.2 | Ar + 25CO$_2$ | 1.5 | ○ | 6.0 | ○ | 1.28 | ○ | 5.8 | ○ | X | Comparative Example |
| 47 | W41 | 1.2 | Ar + 25CO$_2$ | 2.5 | ○ | 12.0 | ○ | 1.92 | X | 24.5 | X | X | Comparative Example |
| 48 | W42 | 1.2 | Ar + 25CO$_2$ | 9.0 | X | 37.0 | X | 1.22 | ○ | 19.2 | X | X | Comparative Example |
| 49 | W27 | 1.2 | Ar + 35CO$_2$ | 6.0 | X | 32.0 | X | 1.49 | ○ | 6.2 | ○ | ○ | Comparative Example |
| 50 | W27 | 1.2 | Ar + 45CO$_2$ | 2.5 | ○ | 11.0 | ○ | 2.02 | X | 8.9 | ○ | ○ | Comparative Example |
| 51 | W27 | 1.2 | Ar + 20CO$_2$ | 12.0 | X | 42.0 | X | 1.28 | ○ | 4.3 | ○ | ○ | Comparative Example |
| 52 | W2 | 1.2 | Ar + 10CO$_2$ | 19.0 | X | 56.0 | X | 0.87 | ○ | 4.2 | ○ | ○ | Comparative Example |
| 53 | W2 | 1.2 | Ar + 20CO$_2$ | 5.5 | X | 31.0 | X | 0.98 | ○ | 4.2 | ○ | ○ | Comparative Example |
| 54 | W2 | 1.2 | Ar + 45CO$_2$ | 0.0 | ◎ | 2.0 | ○ | 1.82 | X | 9.2 | ○ | ○ | Comparative Example |
| 55 | W2 | 1.2 | Ar + 50CO$_2$ | 0.0 | ◎ | 2.0 | ○ | 2.12 | X | 9.8 | ○ | ○ | Comparative Example |
| 56 | W2 | 1.2 | Ar + 60CO$_2$ | 0.0 | ◎ | 1.0 | ○ | 1.98 | X | 10.3 | ○ | X | Comparative Example |
| 57 | W2 | 1.2 | 100% CO$_2$ | 0.0 | ◎ | 1.5 | ○ | 2.21 | X | 14.4 | ○ | X | Comparative Example |

TABLE 3

| Test specimen No. | Wire No. | Wire diameter (mm) | Shielding gas | The number of pits (/250-mm) | | The number of blowholes (/250-mm) | | Spatters (g/min) | | Slag coverage ratio (%) | | External appearance of bead | |
|---|---|---|---|---|---|---|---|---|---|---|---|---|---|
| 58 | W1 | 1.0 | Ar + 25CO$_2$ | 1.0 | ◯ | 0.28 | ◯ | 0.62 | ⊚ | 3.1 | ◯ | ◯ | Example |
| 59 | W1 | 1.0 | Ar + 30CO$_2$ | 0 | ⊚ | 9.0 | ◯ | 0.53 | ⊚ | 3.3 | ◯ | ◯ | Example |
| 60 | W1 | 1.0 | Ar + 35CO$_2$ | 0 | ⊚ | 7.5 | ◯ | 0.72 | ⊚ | 3.2 | ◯ | ◯ | Example |
| 61 | W1 | 1.0 | Ar + 40CO$_2$ | 0 | ⊚ | 5.0 | ◯ | 0.73 | ⊚ | 3.7 | ◯ | ◯ | Example |
| 62 | W1 | 0.9 | Ar + 25CO$_2$ | 1.0 | ◯ | 11.5 | ◯ | 0.58 | ⊚ | 3.8 | ◯ | ◯ | Example |
| 63 | W1 | 0.9 | Ar + 30CO$_2$ | 0 | ⊚ | 8.5 | ◯ | 0.64 | ⊚ | 3.4 | ◯ | ◯ | Example |
| 64 | W1 | 0.9 | Ar + 40CO$_2$ | 0 | ⊚ | 7.0 | ◯ | 0.65 | ⊚ | 4.2 | ◯ | ◯ | Example |
| 65 | W1 | 0.8 | Ar + 25CO$_2$ | 2.0 | ◯ | 13.0 | ◯ | 0.52 | ⊚ | 2.8 | ◯ | ◯ | Example |
| 66 | W1 | 0.8 | Ar + 30CO$_2$ | 1.0 | ◯ | 10.5 | ◯ | 0.55 | ⊚ | 3.8 | ◯ | ◯ | Example |
| 67 | W1 | 0.8 | Ar + 40CO$_2$ | 0 | ⊚ | 9.0 | ◯ | 0.68 | ⊚ | 3.6 | ◯ | ◯ | Example |
| 68 | W1 | 0.7 | Ar + 25CO$_2$ | 2.5 | ◯ | 17.5 | ◯ | 0.71 | ⊚ | 3.7 | ◯ | ◯ | Example |
| 69 | W1 | 0.7 | Ar + 30CO$_2$ | 2.0 | ◯ | 12.0 | ◯ | 0.66 | ⊚ | 3.8 | ◯ | ◯ | Example |
| 70 | W1 | 0.7 | Ar + 40CO$_2$ | 1.0 | ◯ | 10.5 | ◯ | 0.69 | ⊚ | 4.0 | ◯ | ◯ | Example |
| 71 | W1 | <u>1.4</u> | Ar + 25CO$_2$ | 0.5 | ◯ | 5.0 | ◯ | 1.59 | Δ | 3.9 | ◯ | ◯ | Example |
| 72 | W1 | <u>1.4</u> | Ar + 30CO$_2$ | 0 | ⊚ | 4.5 | ◯ | 1.63 | Δ | 3.8 | ◯ | ◯ | Example |
| 73 | W1 | <u>1.4</u> | Ar + 40CO$_2$ | 0 | ⊚ | 3.0 | ◯ | 1.79 | Δ | 4.1 | ◯ | ◯ | Example |
| 74 | W1 | <u>1.6</u> | Ar + 25CO$_2$ | 0 | ⊚ | 4.5 | ◯ | 1.71 | Δ | 3.2 | ◯ | ◯ | Example |
| 75 | W1 | <u>1.6</u> | Ar + 30CO$_2$ | 0 | ⊚ | 4.0 | ◯ | 1.77 | Δ | 3.8 | ◯ | ◯ | Example |
| 76 | W1 | <u>1.6</u> | Ar + 40CO$_2$ | 0 | ⊚ | 2.0 | ◯ | 1.80 | Δ | 3.7 | ◯ | ◯ | Example |
| 77 | W1 | <u>0.6</u> | Ar + 25CO$_2$ | 4.0 | ◯ | 24.0 | Δ | 0.51 | ⊚ | 4.9 | ◯ | ◯ | Example |
| 78 | W1 | <u>0.6</u> | Ar + 30CO$_2$ | 4.5 | ◯ | 22.5 | Δ | 0.55 | ⊚ | 4.2 | ◯ | ◯ | Example |
| 79 | W1 | <u>0.6</u> | Ar + 40CO$_2$ | 3.5 | ◯ | 20.5 | Δ | 0.64 | ⊚ | 4.2 | ◯ | ◯ | Example |
| 80 | <u>W27</u> | 1.0 | Ar + 25CO$_2$ | 13.5 | X | 32.5 | X | 0.74 | ⊚ | 3.9 | ◯ | ◯ | Comparative Example |
| 81 | <u>W27</u> | 1.0 | Ar + 30CO$_2$ | 10.0 | X | 28.0 | Δ | 0.83 | ◯ | 4.4 | ◯ | ◯ | Comparative Example |
| 82 | <u>W27</u> | 1.0 | Ar + 40CO$_2$ | 8.5 | X | 24.5 | Δ | 0.81 | ◯ | 4.8 | ◯ | ◯ | Comparative Example |
| 83 | <u>W27</u> | 0.8 | Ar + 25CO$_2$ | 14.0 | X | 30.5 | X | 0.68 | ⊚ | 4.2 | ◯ | ◯ | Comparative Example |
| 84 | <u>W27</u> | 0.8 | Ar + 30CO$_2$ | 11.5 | X | 29.5 | Δ | 0.64 | ⊚ | 3.8 | ◯ | ◯ | Comparative Example |
| 85 | <u>W27</u> | 0.8 | Ar + 40CO$_2$ | 9.0 | X | 26.5 | Δ | 0.74 | ⊚ | 5.4 | ◯ | ◯ | Comparative Example |

TABLE 4A

| Test specimen No. | Wire No. | Wire diameter (mm) | Shielding gas | First peak current (A) | First peak current term (ms) | Second peak current (A) | Second peak current term (ms) | First-Second shift term (ms) | The number of pits(/250-mm) | | The number of blowholes (/250-mm) | | Spatters (g/min) | | Slag coverage ratio (%) | | External appearance of bead | |
|---|---|---|---|---|---|---|---|---|---|---|---|---|---|---|---|---|---|---|
| 86 | W1 | 1.0 | Ar + 25CO₂ | 500 | 0.4 | 0.28 | 0.6 | 0.3 | 1.5 | ○ | 2.5 | ○ | 0.65 | ◎ | 3.2 | ○ | ○ | Example |
| 87 | W1 | 1.0 | Ar + 25CO₂ | 440 | 0.4 | 350 | 0.6 | 0.3 | 2.0 | ○ | 3.0 | ○ | 0.64 | ◎ | 3.4 | ○ | ○ | Example |
| 88 | W1 | 1.0 | Ar + 25CO₂ | 450 | 0.6 | 350 | 0.6 | 0.3 | 2.5 | ○ | 3.0 | ○ | 0.54 | ◎ | 4.1 | ○ | ○ | Example |
| 89 | W1 | 1.0 | Ar + 25CO₂ | 450 | 0.2 | 350 | 0.6 | 0.3 | 1.0 | ○ | 2.0 | ○ | 0.66 | ◎ | 3.5 | ○ | ○ | Example |
| 90 | W1 | 1.0 | Ar + 25CO₂ | 450 | 0.4 | 400 | 0.6 | 0.3 | 4.5 | ○ | 4.5 | ○ | 0.74 | ◎ | 4.2 | ○ | ○ | Example |
| 91 | W1 | 1.0 | Ar + 25CO₂ | 450 | 0.4 | 300 | 0.6 | 0.3 | 3.0 | ○ | 1.0 | ○ | 0.71 | ◎ | 3.5 | ○ | ○ | Example |
| 92 | W1 | 1.0 | Ar + 25CO₂ | 450 | 0.4 | 350 | 0.6 | 0.3 | 0 | ◎ | 1.0 | ○ | 0.55 | ◎ | 3.3 | ○ | ○ | Example |
| 93 | W1 | 1.0 | Ar + 25CO₂ | 450 | 0.4 | 350 | 0.2 | 0.3 | 0 | ◎ | 2.5 | ○ | 0.65 | ◎ | 4.3 | ○ | ○ | Example |
| 94 | W1 | 1.0 | Ar + 25CO₂ | 450 | 0.4 | 350 | 0.6 | 0.6 | 1.0 | ○ | 1.0 | ○ | 0.63 | ◎ | 5.6 | ○ | ○ | Example |
| 95 | W1 | 1.0 | Ar + 25CO₂ | 450 | 0.4 | 350 | 0.6 | 0.2 | 1.0 | ○ | 2.5 | ○ | 0.74 | ◎ | 3.1 | ○ | ○ | Example |
| 96 | W1 | 1.0 | Ar + 40CO₂ | 480 | 0.4 | 350 | 0.6 | 0.3 | 1.0 | ○ | 5.0 | ○ | 0.62 | ◎ | 4.2 | ○ | ○ | Example |
| 97 | W1 | 1.0 | Ar + 40CO₂ | 440 | 0.4 | 350 | 0.6 | 0.3 | 0 | ◎ | 1.5 | ○ | 0.64 | ◎ | 3.8 | ○ | ○ | Example |
| 98 | W1 | 1.0 | Ar + 40CO₂ | 450 | 0.6 | 350 | 0.6 | 0.3 | 0 | ◎ | 4.0 | ○ | 0.65 | ◎ | 3.9 | ○ | ○ | Example |
| 99 | W1 | 1.0 | Ar + 40CO₂ | 450 | 0.2 | 350 | 0.6 | 0.3 | 1.0 | ○ | 1.0 | ○ | 0.69 | ◎ | 3.2 | ○ | ○ | Example |
| 100 | W1 | 1.0 | Ar + 40CO₂ | 450 | 0.4 | 390 | 0.6 | 0.3 | 2.0 | ○ | 2.0 | ○ | 0.67 | ◎ | 4.1 | ○ | ○ | Example |
| 101 | W1 | 1.0 | Ar + 40CO₂ | 450 | 0.4 | 300 | 0.6 | 0.3 | 0 | ◎ | 4.0 | ○ | 0.62 | ◎ | 2.9 | ○ | ○ | Example |
| 102 | W1 | 1.0 | Ar + 40CO₂ | 450 | 0.4 | 350 | 0.2 | 0.3 | 0 | ◎ | 2.5 | ○ | 0.53 | ◎ | 3.4 | ○ | ○ | Example |
| 103 | W1 | 1.0 | Ar + 40CO₂ | 450 | 0.4 | 350 | 0.6 | 0.6 | 0 | ◎ | 3.5 | ○ | 0.65 | ◎ | 4.3 | ○ | ○ | Example |
| 104 | W1 | 1.0 | Ar + 40CO₂ | 450 | 0.4 | 350 | 0.6 | 0.2 | 0 | ◎ | 3.0 | ○ | 0.69 | ◎ | 4.8 | ○ | ○ | Example |
| 105 | W1 | 1.0 | Ar + 40CO₂ | 450 | 0.4 | 350 | 0.3 | 0.2 | 0 | ◎ | 4.0 | ○ | 0.67 | ◎ | 3.4 | ○ | ○ | Example |
| 106 | W1 | 0.7 | Ar + 25CO₂ | 460 | 0.3 | 300 | 0.3 | 0.3 | 3.5 | ○ | 8.0 | ○ | 0.42 | ◎ | 5.1 | ○ | ○ | Example |
| 107 | W1 | 0.7 | Ar + 25CO₂ | 440 | 0.3 | 300 | 0.3 | 0.2 | 4.0 | ○ | 3.5 | ○ | 0.65 | ◎ | 4.8 | ○ | ○ | Example |
| 108 | W1 | 0.7 | Ar + 25CO₂ | 440 | 0.2 | 300 | 0.3 | 0.2 | 3.0 | ○ | 4.0 | ○ | 0.55 | ◎ | 3.6 | ○ | ○ | Example |
| 109 | W1 | 0.7 | Ar + 25CO₂ | 440 | 0.3 | 360 | 0.3 | 0.2 | 4.5 | ○ | 5.5 | ○ | 0.41 | ◎ | 3.1 | ○ | ○ | Example |
| 110 | W1 | 0.7 | Ar + 25CO₂ | 440 | 0.3 | 300 | 0.3 | 0.2 | 4.0 | ○ | 6.0 | ○ | 0.42 | ◎ | 4.5 | ○ | ○ | Example |
| 111 | W1 | 0.7 | Ar + 25CO₂ | 440 | 0.3 | 300 | 0.3 | 0.2 | 3.5 | ○ | 5.5 | ○ | 0.55 | ◎ | 5.1 | ○ | ○ | Example |
| 112 | W1 | 0.7 | Ar + 25CO₂ | 440 | 0.3 | 300 | 0.2 | 0.3 | 3.0 | ○ | 6.5 | ○ | 0.48 | ◎ | 4.1 | ○ | ○ | Example |
| 113 | W1 | 0.7 | Ar + 25CO₂ | 440 | 0.3 | 300 | 0.3 | 0.3 | 1.0 | ○ | 2.0 | ○ | 0.69 | ◎ | 3.8 | ○ | ○ | Example |
| 114 | W1 | 0.7 | Ar + 25CO₂ | 440 | 0.3 | 300 | 0.3 | 0.2 | 2.5 | ○ | 2.5 | ○ | 0.56 | ◎ | 3.6 | ○ | ○ | Example |
| 115 | W1 | 0.7 | Ar + 40CO₂ | 470 | 0.3 | 300 | 0.3 | 0.2 | 4.5 | ○ | 4.5 | ○ | 0.58 | ◎ | 3.2 | ○ | ○ | Example |
| 116 | W1 | 0.7 | Ar + 40CO₂ | 440 | 0.3 | 300 | 0.3 | 0.2 | 2.5 | ○ | 2.5 | ○ | 0.67 | ◎ | 2.7 | ○ | ○ | Example |
| 117 | W1 | 0.7 | Ar + 40CO₂ | 440 | 0.2 | 300 | 0.3 | 0.2 | 1.5 | ○ | 3.0 | ○ | 0.57 | ◎ | 5.1 | ○ | ○ | Example |
| 118 | W1 | 0.7 | Ar + 40CO₂ | 440 | 0.3 | 300 | 0.3 | 0.2 | 1.0 | ○ | 2.0 | ○ | 0.48 | ◎ | 4.7 | ○ | ○ | Example |
| 119 | W1 | 0.7 | Ar + 40CO₂ | 440 | 0.2 | 330 | 0.3 | 0.2 | 2.0 | ○ | 6.0 | ○ | 0.51 | ◎ | 4.2 | ○ | ○ | Example |
| 120 | W1 | 0.7 | Ar + 40CO₂ | 440 | 0.3 | 300 | 0.3 | 0.3 | 4.0 | ○ | 2.5 | ○ | 0.46 | ◎ | 4.4 | ○ | ○ | Example |
| 121 | W1 | 0.7 | Ar + 40CO₂ | 440 | 0.3 | 300 | 0.2 | 0.2 | 2.0 | ○ | 3.0 | ○ | 0.55 | ◎ | 5.0 | ○ | ○ | Example |
| 122 | W1 | 0.7 | Ar + 40CO₂ | 440 | 0.3 | 300 | 0.3 | 0.2 | 2.5 | ○ | 3.5 | ○ | 0.47 | ◎ | 3.6 | ○ | ○ | Example |
| 123 | W1 | 0.7 | Ar + 40CO₂ | 440 | 0.3 | 300 | 0.3 | 0.2 | 2.0 | ○ | 4.0 | ○ | 0.56 | ◎ | 3.7 | ○ | ○ | Example |
| 124 | W1 | 0.7 | Ar + 40CO₂ | 440 | 0.3 | 300 | 0.3 | 0.3 | 3.0 | ○ | 2.5 | ○ | 0.58 | ◎ | 3.5 | ○ | ○ | Example |
| 125 | W1 | 0.7 | Ar + 40CO₂ | 440 | 0.3 | 300 | 0.3 | 0.2 | 1.0 | ○ | 2.0 | ○ | 0.61 | ◎ | 3.5 | ○ | ○ | Example |

TABLE 4B

| Test specimen No. | Wire No. | Wire diameter (mm) | Shielding gas | First peak current (A) | First peak current term (ms) | Second peak current (A) | Second peak current term (ms) | First-Second shift term (ms) | The number of pits (/250-mm) | | The number of blowholes (/250-mm) | | Spatters (g/min) | | Slag coverage ratio (%) | External appearance of bead | |
|---|---|---|---|---|---|---|---|---|---|---|---|---|---|---|---|---|---|
| 126 | W1 | 1.0 | Ar + 25CO$_2$ | 510 | 0.4 | 0.28 | 0.6 | 0.3 | 1.0 | ○ | 10.5 | ○ | 1.51 | △ | 4.5 | ○ | Example |
| 127 | W1 | 1.0 | Ar + 25CO$_2$ | 430 | 0.4 | 350 | 0.6 | 0.3 | 2.0 | ○ | 12.0 | ○ | 1.56 | △ | 3.8 | ○ | Example |
| 128 | W1 | 1.0 | Ar + 25CO$_2$ | 450 | 0.7 | 350 | 0.6 | 0.3 | 1.0 | ○ | 10.5 | ○ | 0.68 | ◎ | 3.5 | ○ | Example |
| 129 | W1 | 1.0 | Ar + 25CO$_2$ | 450 | 0.1 | 350 | 0.6 | 0.3 | 1.5 | ○ | 8.5 | ○ | 1.59 | △ | 4.5 | ○ | Example |
| 130 | W1 | 1.0 | Ar + 25CO$_2$ | 450 | 0.4 | 410 | 0.6 | 0.3 | 2.0 | ○ | 15.0 | ○ | 0.62 | ◎ | 4.8 | ○ | Example |
| 131 | W1 | 1.0 | Ar + 25CO$_2$ | 450 | 0.4 | 290 | 0.6 | 0.3 | 1.0 | ○ | 15.5 | ○ | 1.65 | △ | 4.6 | ○ | Example |
| 132 | W1 | 1.0 | Ar + 25CO$_2$ | 450 | 0.4 | 350 | 0.7 | 0.3 | 1.5 | ○ | 8.5 | ○ | 0.72 | ◎ | 5.4 | ○ | Example |
| 133 | W1 | 1.0 | Ar + 25CO$_2$ | 450 | 0.4 | 350 | 0.1 | 0.3 | 2.0 | ○ | 9.0 | ○ | 1.66 | △ | 5.1 | ○ | Example |
| 134 | W1 | 1.0 | Ar + 25CO$_2$ | 450 | 0.4 | 350 | 0.6 | 0.7 | 1.0 | ○ | 10.5 | ○ | 0.64 | ◎ | 4.2 | ○ | Example |
| 135 | W1 | 1.0 | Ar + 25CO$_2$ | 450 | 0.4 | 350 | 0.6 | 0.1 | 1.0 | ○ | 15.5 | ○ | 1.68 | △ | 3.8 | ○ | Example |
| 136 | W1 | 1.0 | Ar + 40CO$_2$ | 510 | 0.4 | 350 | 0.6 | 0.3 | 1.0 | ○ | 5.0 | ◎ | 1.52 | △ | 3.4 | ○ | Example |
| 137 | W1 | 1.0 | Ar + 40CO$_2$ | 430 | 0.4 | 350 | 0.6 | 0.3 | 0 | ◎ | 7.0 | ◎ | 1.57 | △ | 4.5 | ○ | Example |
| 138 | W1 | 1.0 | Ar + 40CO$_2$ | 450 | 0.7 | 350 | 0.6 | 0.3 | 0 | ◎ | 6.5 | ◎ | 0.77 | ○ | 5.1 | ○ | Example |
| 139 | W1 | 1.0 | Ar + 40CO$_2$ | 450 | 0.1 | 350 | 0.6 | 0.3 | 0 | ◎ | 8.5 | ◎ | 1.69 | △ | 5.8 | ○ | Example |
| 140 | W1 | 1.0 | Ar + 40CO$_2$ | 450 | 0.4 | 410 | 0.6 | 0.3 | 1.0 | ○ | 8.0 | ◎ | 0.76 | ○ | 4.3 | ○ | Example |
| 141 | W1 | 1.0 | Ar + 40CO$_2$ | 450 | 0.4 | 290 | 0.6 | 0.3 | 0 | ◎ | 6.5 | ◎ | 1.67 | △ | 4.5 | ○ | Example |
| 142 | W1 | 1.0 | Ar + 40CO$_2$ | 450 | 0.4 | 350 | 0.7 | 0.3 | 1.0 | ○ | 7.0 | ◎ | 0.77 | ○ | 3.9 | ○ | Example |
| 143 | W1 | 1.0 | Ar + 40CO$_2$ | 450 | 0.4 | 350 | 0.1 | 0.3 | 0 | ◎ | 8.5 | ◎ | 1.77 | △ | 3.8 | ○ | Example |
| 144 | W1 | 1.0 | Ar + 40CO$_2$ | 450 | 0.4 | 350 | 0.6 | 0.7 | 0 | ◎ | 4.5 | ◎ | 0.79 | ○ | 4.5 | ○ | Example |
| 145 | W1 | 1.0 | Ar + 40CO$_2$ | 450 | 0.4 | 350 | 0.6 | 0.1 | 0 | ◎ | 6.5 | ◎ | 1.69 | △ | 4.7 | ○ | Example |
| 146 | W1 | 0.7 | Ar + 25CO$_2$ | 510 | 0.3 | 300 | 0.3 | 0.2 | 2.5 | ○ | 17.5 | ○ | 1.59 | △ | 5.7 | ○ | Example |
| 147 | W1 | 0.7 | Ar + 25CO$_2$ | 430 | 0.3 | 300 | 0.3 | 0.2 | 2.0 | ○ | 15.5 | ○ | 1.68 | △ | 4.5 | ○ | Example |
| 148 | W1 | 0.7 | Ar + 25CO$_2$ | 440 | 0.7 | 300 | 0.3 | 0.2 | 1.5 | ○ | 18.5 | ○ | 0.65 | ◎ | 3.9 | ○ | Example |
| 149 | W1 | 0.7 | Ar + 25CO$_2$ | 440 | 0.1 | 300 | 0.3 | 0.2 | 2.0 | ○ | 16.0 | ○ | 1.62 | △ | 4.2 | ○ | Example |
| 150 | W1 | 0.7 | Ar + 25CO$_2$ | 440 | 0.3 | 410 | 0.3 | 0.2 | 2.5 | ○ | 13.0 | ○ | 0.68 | ◎ | 4.5 | ○ | Example |
| 151 | W1 | 0.7 | Ar + 25CO$_2$ | 440 | 0.3 | 290 | 0.3 | 0.2 | 2.0 | ○ | 12.5 | ○ | 1.63 | △ | 4.7 | ○ | Example |
| 152 | W1 | 0.7 | Ar + 25CO$_2$ | 440 | 0.3 | 300 | 0.7 | 0.2 | 2.5 | ○ | 14.5 | ○ | 0.61 | ◎ | 5.1 | ○ | Example |
| 153 | W1 | 0.7 | Ar + 25CO$_2$ | 440 | 0.3 | 300 | 0.1 | 0.2 | 1.5 | ○ | 15.5 | ○ | 1.70 | △ | 5.0 | ○ | Example |
| 154 | W1 | 0.7 | Ar + 25CO$_2$ | 440 | 0.3 | 300 | 0.3 | 0.7 | 1.0 | ○ | 15.0 | ○ | 0.64 | ◎ | 4.5 | ○ | Example |
| 155 | W1 | 0.7 | Ar + 25CO$_2$ | 440 | 0.3 | 300 | 0.3 | 0.1 | 2.0 | ○ | 17.5 | ○ | 1.65 | △ | 3.7 | ○ | Example |
| 156 | W1 | 0.7 | Ar + 40CO$_2$ | 510 | 0.3 | 300 | 0.3 | 0.2 | 1.0 | ○ | 10.5 | ○ | 0.85 | ○ | 3.9 | ○ | Example |
| 157 | W1 | 0.7 | Ar + 40CO$_2$ | 430 | 0.3 | 300 | 0.3 | 0.2 | 1.5 | ○ | 12.5 | ○ | 1.55 | △ | 4.5 | ○ | Example |
| 158 | W1 | 0.7 | Ar + 40CO$_2$ | 440 | 0.7 | 300 | 0.3 | 0.2 | 2.5 | ○ | 13.0 | ○ | 0.61 | ◎ | 5.0 | ○ | Example |
| 159 | W1 | 0.7 | Ar + 40CO$_2$ | 440 | 0.1 | 300 | 0.3 | 0.2 | 1.0 | ○ | 18.0 | ○ | 1.62 | △ | 5.0 | ○ | Example |
| 160 | W1 | 0.7 | Ar + 40CO$_2$ | 440 | 0.3 | 410 | 0.3 | 0.2 | 1.5 | ○ | 15.5 | ○ | 0.63 | ◎ | 5.1 | ○ | Example |
| 161 | W1 | 0.7 | Ar + 40CO$_2$ | 440 | 0.3 | 290 | 0.3 | 0.2 | 2.5 | ○ | 16.0 | ○ | 1.63 | △ | 3.9 | ○ | Example |
| 162 | W1 | 0.7 | Ar + 40CO$_2$ | 440 | 0.3 | 300 | 0.7 | 0.2 | 2.0 | ○ | 12.5 | ○ | 0.69 | ◎ | 4.8 | ○ | Example |
| 163 | W1 | 0.7 | Ar + 40CO$_2$ | 440 | 0.3 | 300 | 0.1 | 0.2 | 1.5 | ○ | 13.0 | ○ | 1.64 | △ | 3.8 | ○ | Example |
| 164 | W1 | 0.7 | Ar + 40CO$_2$ | 440 | 0.3 | 300 | 0.3 | 0.7 | 2.5 | ○ | 14.5 | ○ | 0.63 | ◎ | 3.4 | ○ | Example |
| 165 | W1 | 0.7 | Ar + 40CO$_2$ | 440 | 0.3 | 300 | 0.3 | 0.1 | 2.0 | ○ | 15.5 | ○ | 1.63 | △ | 5.1 | ○ | Example |

TABLE 5

| Test specimen No. | Wire No. | Wire diameter (mm) | Shielding gas | Wave frequency (Hz) | The number of pits (/250-mm) | | The number of blowholes (/250-mm) | | Spatters (g/min) | | Slag coverage ratio (%) | | External appearance of bead | | |
|---|---|---|---|---|---|---|---|---|---|---|---|---|---|---|---|
| 166 | W1 | 1.0 | Ar + 25CO$_2$ | 5 | 0 | ◎ | 1.5 | ○ | 0.56 | ◎ | 3.2 | ○ | ○ | Example |
| 167 | W1 | 1.0 | Ar + 25CO$_2$ | 10 | 0 | ◎ | 1.0 | ○ | 0.56 | ◎ | 3.7 | ○ | ○ | Example |
| 168 | W1 | 1.0 | Ar + 25CO$_2$ | 15 | 0 | ◎ | 0.5 | ○ | 0.54 | ◎ | 3.6 | ○ | ○ | Example |
| 169 | W1 | 1.0 | Ar + 25CO$_2$ | 20 | 0 | ◎ | 1.0 | ○ | 0.55 | ◎ | 4.0 | ○ | ○ | Example |
| 170 | W1 | 1.0 | Ar + 25CO$_2$ | 25 | 0 | ◎ | 1.0 | ○ | 0.64 | ◎ | 4.1 | ○ | ○ | Example |
| 171 | W1 | 1.0 | Ar + 25CO$_2$ | 30 | 0 | ◎ | 1.5 | ○ | 0.50 | ◎ | 3.5 | ○ | ○ | Example |
| 172 | W1 | 1.0 | Ar + 40CO$_2$ | 5 | 0 | ◎ | 0.5 | ○ | 0.65 | ◎ | 3.7 | ○ | ○ | Example |
| 173 | W1 | 1.0 | Ar + 40CO$_2$ | 10 | 0 | ◎ | 1.5 | ○ | 0.64 | ◎ | 3.9 | ○ | ○ | Example |
| 174 | W1 | 1.0 | Ar + 40CO$_2$ | 15 | 0 | ◎ | 1.0 | ○ | 0.66 | ◎ | 4.1 | ○ | ○ | Example |
| 175 | W1 | 1.0 | Ar + 40CO$_2$ | 20 | 0 | ◎ | 1.0 | ○ | 0.51 | ◎ | 3.2 | ○ | ○ | Example |
| 176 | W1 | 1.0 | Ar + 40CO$_2$ | 25 | 0 | ◎ | 0.5 | ○ | 0.54 | ◎ | 3.1 | ○ | ○ | Example |
| 177 | W1 | 1.0 | Ar + 40CO$_2$ | 30 | 0 | ◎ | 1.5 | ○ | 0.58 | ◎ | 3.4 | ○ | ○ | Example |
| 178 | W1 | 0.7 | Ar + 25CO$_2$ | 5 | 0 | ◎ | 2.0 | ○ | 0.60 | ◎ | 5.1 | ○ | ○ | Example |
| 179 | W1 | 0.7 | Ar + 25CO$_2$ | 10 | 0 | ◎ | 1.5 | ○ | 0.54 | ◎ | 5.7 | ○ | ○ | Example |
| 180 | W1 | 0.7 | Ar + 25CO$_2$ | 15 | 0 | ◎ | 1.0 | ○ | 0.55 | ◎ | 4.7 | ○ | ○ | Example |
| 181 | W1 | 0.7 | Ar + 25CO$_2$ | 20 | 0 | ◎ | 2.0 | ○ | 0.56 | ◎ | 4.6 | ○ | ○ | Example |
| 182 | W1 | 0.7 | Ar + 25CO$_2$ | 25 | 0 | ◎ | 1.0 | ○ | 0.55 | ◎ | 5.0 | ○ | ○ | Example |
| 183 | W1 | 0.7 | Ar + 25CO$_2$ | 30 | 0 | ◎ | 1.0 | ○ | 0.53 | ◎ | 5.3 | ○ | ○ | Example |
| 184 | W1 | 0.7 | Ar + 40CO$_2$ | 5 | 0 | ◎ | 2.0 | ○ | 0.55 | ◎ | 5.5 | ○ | ○ | Example |
| 185 | W1 | 0.7 | Ar + 40CO$_2$ | 10 | 0 | ◎ | 1.5 | ○ | 0.52 | ◎ | 5.7 | ○ | ○ | Example |
| 186 | W1 | 0.7 | Ar + 40CO$_2$ | 15 | 0 | ◎ | 0.5 | ○ | 0.57 | ◎ | 4.9 | ○ | ○ | Example |
| 187 | W1 | 0.7 | Ar + 40CO$_2$ | 20 | 0 | ◎ | 1.5 | ○ | 0.59 | ◎ | 4.2 | ○ | ○ | Example |
| 188 | W1 | 0.7 | Ar + 40CO$_2$ | 25 | 0 | ◎ | 1.0 | ○ | 0.54 | ◎ | 5.3 | ○ | ○ | Example |
| 189 | W1 | 0.7 | Ar + 40CO$_2$ | 30 | 0 | ◎ | 0.5 | ○ | 0.57 | ◎ | 5.5 | ○ | ○ | Example |
| 190 | W1 | 1.0 | Ar + 25CO$_2$ | <u>1</u> | 2.5 | ○ | 25.0 | △ | 0.85 | ○ | 3.8 | ○ | ○ | Example |
| 191 | W1 | 1.0 | Ar + 25CO$_2$ | <u>3</u> | 3.0 | ○ | 20.2 | △ | 0.64 | ◎ | 3.4 | ○ | ○ | Example |
| 192 | W1 | 1.0 | Ar + 25CO$_2$ | <u>40</u> | 0 | ◎ | 2.0 | ○ | 0.76 | ○ | 3.8 | ○ | ○ | Example |
| 193 | W1 | 1.0 | Ar + 40CO$_2$ | <u>1</u> | 2.0 | ○ | 27.5 | △ | 0.78 | ○ | 4.1 | ○ | ○ | Example |
| 194 | W1 | 1.0 | Ar + 40CO$_2$ | <u>3</u> | 4.0 | ○ | 22.0 | △ | 0.71 | ◎ | 3.9 | ○ | ○ | Example |
| 195 | W1 | 1.0 | Ar + 40CO$_2$ | <u>40</u> | 0 | ◎ | 2.5 | ○ | 0.77 | ○ | 3.8 | ○ | ○ | Example |
| 196 | W1 | 0.7 | Ar + 25CO$_2$ | <u>1</u> | 1.5 | ○ | 21.5 | △ | 0.86 | ○ | 4.5 | ○ | ○ | Example |
| 197 | W1 | 0.7 | Ar + 25CO$_2$ | <u>3</u> | 1.0 | ○ | 26.0 | △ | 0.54 | ◎ | 4.2 | ○ | ○ | Example |
| 198 | W1 | 0.7 | Ar + 25CO$_2$ | <u>40</u> | 2.5 | ○ | 2.5 | ○ | 0.53 | ◎ | 4.1 | ○ | ○ | Example |
| 199 | W1 | 0.7 | Ar + 40CO$_2$ | <u>1</u> | 1.0 | ○ | 21.5 | △ | 0.82 | ○ | 4.0 | ○ | ○ | Example |
| 200 | W1 | 0.7 | Ar + 40CO$_2$ | <u>3</u> | 2.5 | ○ | 22.0 | △ | 0.56 | ◎ | 4.1 | ○ | ○ | Example |
| 201 | W1 | 0.7 | Ar + 40CO$_2$ | <u>40</u> | 2.0 | ○ | 2.0 | ○ | 0.55 | ◎ | 4.8 | ○ | ○ | Example |

Tables 2A and 2B show results obtained in the case of varying the solid wire composition and the shielding gas composition.

In Table 2A, Test Specimens No. 1 to 32 are examples of the present invention. In each of the examples, the number of its pits, the number of its blowholes, and the spatter amount were decreased. Furthermore, the slag coverage ratio was also restrained and the external appearance of the bead was good.

Test Specimen No. 13 (wire No. W13) is a specimen not plated with copper. It was understood that the specimen produced the same effects as the other plated wires. Test Specimens Nos. 27 to 32 are specimens in each of which the CO$_2$ content by percentage in the shielding gas were made considerably larger than that in a conventional shielding gas (Ar-20% CO$_2$). It was understood that the specimens gained very good pore-resisting performance.

By contrast, in Table 2B, Test Specimens No. 33 to 57 are comparative examples of the present invention.

In Test Specimens Nos. 33 to 49, the CO$_2$ content by percentage in their shielding gas fell in the range specified by the present invention. However, in Test Specimen No. 33, the S content was large to make the surface tension lower so that many pits and blowholes were generated.

In Test Specimen No. 34, the ratio of Mn/Si was small so that the deoxidizing effect was deteriorated and the surface tension was also lowered. Thus, many blowholes were generated.

In Test Specimens Nos. 35 and 36, the ratio of Mn/Si was large so that the slag coverage ratio was high and the external appearance of the bead was bad.

In Test Specimens Nos. 37 and 38, the S content was large so that many pits and blowholes were generated. In Test Specimen No. 37, spatters increased.

In Test Specimen No. 39, the Cr content was large so that the solid wire increased in viscosity. Thus, a bead in a convex form was obtained.

In Test Specimen No. 40, the Si content was large, and the Cu content was also large, so that the wire was broken by an excessive strength thereof when elongated.

In Test Specimens Nos. 41 to 43, the S content was large so that many pits and blowholes were generated. In Test Specimen 43, spatters increased and further the external appearance of the bead was bad.

In Test Specimen No. 44, the S content was large, and the Mo content was also large, so that the bead surface was cracked and many pits and blowholes were generated.

In Test Specimen No. 45, the respective contents of Si, Mn and S did not fall in the ranges specified in the present invention, so that the slag coverage ratio was high and the external appearance of the bead was bad.

In Test Specimen No. 46, the P content was large so that the bead surface was cracked.

In Test Specimen No. 47, the respective contents of Si and Mn were large so that the slag coverage ratio was high, and the C content was large so that spatters increased.

In Test Specimens Nos. 48 and 49, the S content was large so that many pits and blowholes were generated. In Test Specimen 48, the slag coverage ratio was high, and the external appearance of the bead was bad.

In Test Specimens Nos. 51 to 53, the CO$_2$ content by percentage in their shielding gas was small so that many pits and blowholes were generated.

In Test Specimens Nos. 50, and 54 to 57, the $CO_2$ content by percentage in their shielding gas was large so that many spatters were generated.

Table 3 shows results obtained in the case of varying the solid wire diameter, the solid wire composition, and the shielding gas composition.

In Table 3, Test Specimens Nos. 58 to 79 are examples of the present invention. In each of the examples, the number of its pits, the number of its blowholes, and the spatter amount were decreased. Furthermore, the slag coverage ratio was also restrained, and the external appearance of the bead was good.

In particular, Test Specimens Nos. 58 to 70 had a wire diameter of 0.7 to 1.1 mm to result in gaining a very good spatter-restraining effect and a good blowhole-restraining effect.

Test Specimens Nos. 71 to 76 had a large wire diameter to result merely in gaining a relatively good blowhole-restraining effect.

Test Specimens Nos. 77 to 79 had a small wire diameter to result merely in gaining a relatively good blowhole-restraining effect.

By contrast, Test Specimens Nos. 80 to 85 in Table 3 are comparative examples of the present invention.

In Test Specimens Nos. 80 to 85, the S content was large so that the surface tension was low and many pits and blowhole were generated.

Tables 4A and 4B each show results obtained in the case of varying the pulse current waveform, the solid wire diameter, and the shielding gas composition.

In Tables 4A and 4B, Test Specimens Nos. 86 to 165 are examples of the present invention. In each of the examples, the number of its pits, the number of its blowholes, and the spatter amount were decreased. Furthermore, the slag coverage ratio was also restrained, and the external appearance of the bead was good.

In particular, Test Specimens Nos. 86 to 125 each made use of a pulse current satisfying conditions specified in the present invention for the current value of the first peak, the term for the peak, the current value of the second peak, the term for the peak, and the shift term to result in gaining a very good spatter-restraining effect and good or better pit- and blowhole-restraining effects.

By contrast, Test Specimens Nos. 126 to 165 each made use of a pulse current not satisfying the condition specified in the present invention for any one of the current value of the first peak, the term for the peak, the current value of the second peak, the term for the peak, and the shift term to result in being slightly poorer in any one of the pit-restraining effect, the blowhole-restraining effect and spatter-restraining effect than that of Test Specimens Nos. 86 to 125.

Regarding, for example, Test Specimens Nos. 126 to 135, 139, 143, and 146 to 165, the blowhole-restraining effect was good, but the number of the blowholes was 8.5/250-mm or more. Thus, the blowhole-restraining effect was slightly poorer when compared with that of Test Specimens Nos. 86 to 125.

Regarding Test Specimens Nos. 126, 127, 129, 131, 133, 135 to 147, 149, 151, 153, 155 to 157, 159, 161, 163 and 165, merely the spatter-restraining effect was good or relatively good. The spatter-restraining effect was slightly poorer than that of Test Specimens Nos. 86 to 125.

Table 5 shows results obtained in the case of varying the pulse frequency of the pulse current, the solid wire diameter, and the shielding gas composition.

In Table 5, Test Specimens Nos. 166 to 201 are examples of the present invention. In each of the examples, the number of its pits, the number of its blowholes, and the spatter amount were decreased. Furthermore, the slag coverage ratio was also restrained, and the external appearance of the bead was good.

In particular, Test Specimens Nos. 166 to 189 each made use of a pulse current in which the first and second periods were repeated at one of the predetermined frequencies specified in the present invention to result in gaining very good pit-restraining effect and spatter-restraining effect, and further a good blowhole-restraining effect.

By contrast, Test Specimens Nos. 190 to 201 each made use of a pulse current not satisfying the condition that the first and second periods were repeated at one of the predetermined frequencies specified in the present invention to result in being slightly poorer in any one of the pit-restraining effect, the blowhole-restraining effect, and spatter-restraining effect than Test Specimens Nos. 166 to 189.

For example, Test Specimens Nos. 190, 191, 193, 194, and 196 to 201 were good merely in the pit-restraining effect. The pit-restraining effect was slightly poorer than that of Test Specimens Nos. 166 to 189.

Test Specimens Nos. 190, 191, 193, 194, 196, 197, 199, and 200 were relatively good merely in the blowhole-restraining effect. The blowhole-restraining effect was slightly poorer than that of Test Specimens Nos. 166 to 189.

Test Specimens Nos. 190, 192, 193, 195, 196, and 199 were good merely in the spatter-restraining effect. The spatter-restraining effect was slightly poorer than that of Test Specimens Nos. 166 to 189.

The above has described the solid wire and gas-shielded arc welding method using this wire according to the present invention in more detail by way of the embodiments and the working examples of the invention. However, the subject matters of the invention are not limited by the descriptions, and should be broadly interpreted on the basis of the claims.

REFERENCE SIGNS LIST

1: Solid wire (Wire), 2: Arc, 3: Zinc gas, 4: Melted droplet formed around the tip of the solid wire (Melted droplet, Melted metal), 5: Spherical melted droplet, 6: Edge, 7: Bead, 10: Pulse current (present invention), 20: Pulse current (Conventional Art), W: Base metal member, ST: Surface tension, Tup: Peak rising-up term, Tp1: First peak term, Tsf: Shift term, Tp2: Second peak term, Tdn: Peak falling-down term, Tb: Base term, Tf: one pulse cycle, P1: First period, P2: Second period

The invention claimed is:

1. A solid wire, comprising: relative to the total mass of the solid wire,

C: 0.15% by mass or less,

Si: 0.40 to 0.90% by mass,

Mn: 0.20 to 1.50% by mass,

P: 0.0500% by mass or less,

S: 0.0080% by mass or less,

O: 0.0100% by mass or less,

Cr: 1.00% by mass or less, and

Fe, with the proviso that when P is 0.05% by mass or less and 0.007% by mass or greater, Cr is 0.09% by mass or less, or P is 0.007% by mass or less, Cr is 1.00% by mass or less;

wherein
the solid wire satisfies the following two conditions:

1.0≤(percentage by mass of Si+percentage by mass of Mn)/{100(percentage by mass of S+percentage by mass of O)}≤4.0, and 0.50≤percentage by mass of Mn/percentage by mass of Si≤2.00, and the solid wire is suitable for gas-shielded arc welding using a shielding gas, which is an Ar gas comprising 25 to 40% of $CO_2$ gas.

2. The solid wire according to claim 1, which has a wire diameter of from 0.7 to 1.1 mm.

3. A gas-shielded arc welding method, comprising:
feeding the solid wire according to claim 1 into the shielding gas; and
supplying a welding current to the solid wire to generate arc between the solid wire and a galvanized steel sheet which is a base metal member, thereby welding the steel sheet.

4. The gas-shielded arc welding method according to claim 3, wherein
the welding current is a pulse current,
the pulse current is a current generated by repeating an electric conduction for a first peak, an electric conduction for a second peak, and an electric conduction of a base current as one pulse cycle,
the first peak has a current value of from 440 to 500 A, and a term of from 0.2 to 0.6 ms,
the second peak has a current value of from 300 to 400 A, and a term of from 0.2 to 0.6 ms, and
a term for which the pulse current shifts from the first peak to the second peak is from 0.2 to 0.6 ms.

5. The gas-shielded arc welding method according to claim 3, wherein,
the welding current is a pulse current generated by repeating alternately a first period in which one pulse cycle is densely and continuously recurred, and a second period in which one pulse cycle is thinly and continuously recurred, and
the first period and the second period are repeated at a frequency of from 5 to 30 Hz.

6. The solid wire according to claim 1, wherein the solid wire is suitable for galvanized steel sheet welding.

7. A gas-shielded arc welding method, comprising:
feeding a solid wire into a shielding gas; and
supplying a welding current to the solid wire to generate arc between the solid wire and a galvanized steel sheet which is a base metal member, thereby welding the steel sheet;
wherein the welding current is a pulse current,
the pulse current is a current generated by repeating an electric conduction for a first peak, an electric conduction for a second peak, and an electric conduction of a base current as one pulse cycle,
the first peak has a current value of from 440 to 500 A, and a term of from 0.2 to 0.6 ms,
the second peak has a current value of from 300 to 400 A, and a term of from 0.2 to 0.6 ms, and
a term for which the pulse current shifts from the first peak to the second peak is from 0.2 to 0.6 ms,
wherein the solid wire, comprises, relative to the total mass of the solid wire,
C: 0.15% by mass or less,
Si: 0.40 to 0.90% by mass,
Mn: 0.20 to 1.50% by mass,
P: 0.0500% by mass or less,
S: 0.0080% by mass or less,
O: 0.0100% by mass or less,
Cr: 1.00% by mass or less, and
Fe,
wherein the solid wire satisfies the following two conditions:

1.0≤(percentage by mass of Si+percentage by mass of Mn)/{100(percentage by mass of S+percentage by mass of O)}≤4.0, and 0.50≤percentage by mass of Mn/percentage by mass of Si≤2.00, and wherein the shielding gas is an Ar gas comprising 25 to 40% of $CO_2$ gas.

8. A gas-shielded arc welding method, comprising:
feeding a solid wire into a shielding gas; and
supplying a welding current to the solid wire to generate arc between the solid wire and a galvanized steel sheet which is a base metal member, thereby welding the steel sheet,
wherein the welding current is a pulse current generated by repeating alternately a first period in which one pulse cycle is densely and continuously recurred, and a second period in which one pulse cycle is thinly and continuously recurred, and
the first period and the second period are repeated at a frequency of from 5 to 30 Hz;
wherein the solid wire, comprises, relative to the total mass of the solid wire,
C: 0.15% by mass or less,
Si: 0.40 to 0.90% by mass,
Mn: 0.20 to 1.50% by mass,
P: 0.0500% by mass or less,
S: 0.0080% by mass or less,
O: 0.0100% by mass or less,
Cr: 1.00% by mass or less, and
Fe,
wherein the solid wire satisfies the following two conditions:

1.0≤(percentage by mass of Si+percentage by mass of Mn)/{100(percentage by mass of S+percentage by mass of O)}≤4.0, and 0.50≤percentage by mass of Mn/percentage by mass of Si≤2.00, and wherein the shielding gas is an Ar gas comprising 25 to 40% of $CO_2$ gas.

9. The solid wire according to claim 1, wherein
Nb: 0.009% by mass or less.

10. The method according to claim 7, wherein
Nb: 0.009% by mass or less.

11. The method according to claim 8, wherein
Nb: 0.009% by mass or less.

12. The solid wire according to claim 1, wherein the solid wire is not plated with Cu.

13. The method according to claim 7, wherein the solid wire is not plated with Cu.

14. The method according to claim 8, wherein the solid wire is not plated with Cu.

15. The solid wire according to claim 1, further with the proviso that when P is 0.05% by mass or less and 0.006% by mass or greater, Cr is 0.08% by mass or less; or P is 0.006% by mass or less and Cr is 1.00% by mass or less.

* * * * *

UNITED STATES PATENT AND TRADEMARK OFFICE
CERTIFICATE OF CORRECTION

PATENT NO.         : 9,616,528 B2
APPLICATION NO.    : 14/382691
DATED              : April 11, 2017
INVENTOR(S)        : Shun Izutani et al.

Page 1 of 1

It is certified that error appears in the above-identified patent and that said Letters Patent is hereby corrected as shown below:

On the Title Page

Item (71), the 2nd Applicant's information has been omitted. Item (71) should read:
-- (71) Applicants: KABUSHIKI KAISHA KOBE SEIKO SHO (Kobe Steel, Ltd.), Kobe-shi (JP); DAIHEN Corporation, Osaka-shi (JP) --

Signed and Sealed this
First Day of May, 2018

Andrei Iancu
*Director of the United States Patent and Trademark Office*